US009395863B2

(12) United States Patent
Nakayama et al.

(10) Patent No.: US 9,395,863 B2
(45) Date of Patent: Jul. 19, 2016

(54) TOUCH PANEL AND DISPLAY DEVICE

(71) Applicant: FUJIFILM Corporation, Tokyo (JP)

(72) Inventors: Masaya Nakayama, Kanagawa-ken (JP); Kazuhiro Hasegawa, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/864,872

(22) Filed: Sep. 25, 2015

(65) Prior Publication Data

US 2016/0018932 A1   Jan. 21, 2016

Related U.S. Application Data

(63) Continuation of application No. PCT/JP2014/053585, filed on Feb. 17, 2014.

(30) Foreign Application Priority Data

Mar. 26, 2013   (JP) ................................ 2013-064316

(51) Int. Cl.
*G09G 5/00* (2006.01)
*G06F 3/047* (2006.01)
*G06F 3/041* (2006.01)
*G06F 3/044* (2006.01)

(52) U.S. Cl.
CPC ............... *G06F 3/047* (2013.01); *G06F 3/041* (2013.01); *G06F 3/044* (2013.01); *G06F 3/0412* (2013.01); *G06F 2203/04103* (2013.01); *G06F 2203/04112* (2013.01)

(58) Field of Classification Search
CPC ... G06F 2203/041; G06F 3/047; G06F 3/044; G06F 3/041; G06F 2203/04111; G06F 2203/04112; H05K 1/0289

USPC .................................................. 345/173–178
See application file for complete search history.

(56) References Cited

U.S. PATENT DOCUMENTS

| 2012/0313880 | A1  | 12/2012 | Geaghan et al. |
| 2014/0041999 | A1* | 2/2014  | Yim ......................... H01H 1/06 200/275 |
| 2014/0098307 | A1  | 4/2014  | Iwami |
| 2015/0015980 | A1* | 1/2015  | Iwami .................. H05K 9/0096 359/893 |
| 2016/0011700 | A1* | 1/2016  | Hasegawa ............... G06F 3/044 345/174 |

FOREIGN PATENT DOCUMENTS

| JP | 2011-074308 | 4/2011 |
| JP | 2011-517355 | 6/2011 |
| WO | 2013008827  | 1/2013 |

OTHER PUBLICATIONS

"International Search Report (Form PCT/ISA/210)", mailed on Apr. 28, 2014, with English translation thereof, pp. 1-3.

* cited by examiner

*Primary Examiner* — Jennifer Nguyen
(74) *Attorney, Agent, or Firm* — Jianq Chyun IP Office

(57) ABSTRACT

A touch panel and a display device are disclosed. Either a cell or a cell, which is formed by the intersections of silver fine wires which form either first electrodes or second electrodes, forms parallelogram shapes (preferably rhomboids), having opposite angles wherein intersection angles are obtuse angles and intersection angles are acute angles. The first electrodes and/or the second electrodes have an adhesive (OCA) deployed thereupon, which has a loss coefficient (tan δ) of 0.13 or more at 140° C. and 1 Hz, and a reserve elasticity of $8.9 \times 10^4$ Pa or less at 25° C. and 1 Hz.

9 Claims, 10 Drawing Sheets

TOUCH PANEL AND DISPLAY DEVICE

CROSS-REFERENCE TO RELATED APPLICATIONS AND PRIORITY CLAIMS

This application is a Continuation of International Application No. PCT/JP2014/053585 filed on Feb. 17, 2014, which was published under PCT Article 21(2) in Japanese, which is based upon and claims the benefit of priority from Japanese Patent Application No. 2013-064316 filed on Mar. 26, 2013, the contents all of which are incorporated herein by reference.

TECHNICAL FIELD

The present invention relates to a touch panel and a display device, and more particularly to a touch panel and a display device that are provided with cells of a parallelogrammatic shape, which are defined by fine lines of silver crossing each other.

BACKGROUND ART

Touch panels are provided with sensors that detect the position where the touch panel surface is pressed by an object (e.g., a finger). Each of such sensors includes first electrodes and second electrodes, which extend perpendicularly to each other. As is well known in the art, an insulating layer is interposed between the first electrodes and the second electrodes.

The first electrodes and the second electrodes comprise a mesh made up of intersecting fine lines of metal, which are perpendicular to each other (see Japanese Laid-Open Patent Publication No. 2011-517355 (PCT)). Spaces that are surrounded by the intersecting fine lines of metal also are referred to as cells. Since the fine lines of metal intersect perpendicularly with respect to each other, each of the cells is of a square shape. The fine lines of metal mostly comprise fine lines of silver (Ag) in view of electroconductivity, cost, color, etc., which are taken into account.

As disclosed in Japanese Laid-Open Patent Publication No. 2011-074308, a first electrode layer, which includes the first electrodes arranged in the foregoing manner, or a second electrode layer, which includes the second electrodes arranged in the foregoing manner, is applied to a display device, a board, an optical sheet, or the like by an optically clear adhesive (OCA). Since the first electrode layer or the second electrode layer is shaped convexly toward the insulating layer that serves as a base, steps are formed between the insulating layer and the first electrode layer or the second electrode layer. The OCA is required to adequately cover both the insulating layer and the first electrode layer or the second electrode layer, regardless of the steps (improved step conformability).

SUMMARY OF INVENTION

On the condition that the silver mesh transparent electrodes, as disclosed in Japanese Laid-Open Patent Publication No. 2011-517355 (PCT), are used in a touch panel, then the silver mesh transparent electrodes are effective to reduce the cell pitch, reduce the widthwise dimension of the fine silver lines, and arrange the fine silver lines obliquely to the layout of pixels of a liquid crystal display or the like, such that each cell is of a lozenge shape or a parallelogrammatic shape having acute angles, in order to improve the touch panel in terms of image quality based on increased mesh visibility and transmittance, as well as to achieve a reduction in moire phenomena.

However, in a case where an OCA is applied to a silver mesh transparent electroconductive film, which includes cells of a lozenge shape or a parallelogrammatic shape having acute angles, the OCA fails to enter into the acute-angled portions of the cells, i.e., a seepage failure occurs, resulting in a problem in that the OCA does not stick to the acute-angled portions, but gaps are developed therein.

As a consequence, water is likely to find its way through the gaps in the acute-angled portions, causing ion migration, which leads to faults such as a change in the resistance value of the first electrode layer or the second electrode layer, as well as short circuiting. It has been found that faults due to ion migration are liable to happen on condition that the widthwise dimension of the fine silver lines is reduced as much as possible, e.g., to 4 μm or less, in recent attempts to increase the visibility of the touch panel.

A major object of the present invention is to provide a touch panel, which employs an OCA that is capable of seeping suitably into the acute-angled portions of cells, to thereby prevent the fine silver lines from suffering from ion migration.

Another object of the present invention is to provide a display device, which is provided with such a touch panel.

The above objects can be accomplished by the following arrangements.

[1] A touch panel having a first electrode layer and a second electrode layer, which face each other with an insulating layer interposed therebetween, wherein:

the first electrode layer includes a plurality of first electrodes extending along a first direction and arrayed parallel to each other along a second direction that is perpendicular to the first direction;

the second electrode layer includes a plurality of second electrodes extending along the second direction and arrayed parallel to each other along the first direction;

at least one of the first electrodes and the second electrodes comprises a mesh of fine silver lines each having a widthwise dimension of 4 μm or less;

the mesh includes a plurality of cells defined by the fine silver lines crossing each other;

at least one of the cells is of a parallelogrammatic shape having opposite angles for which crossing angles formed by the fine silver lines crossing each other are obtuse angles, and opposite angles for which crossing angles formed by the fine silver lines crossing each other are acute angles; and an adhesive, whose loss coefficient tan δ at 140° C. and 1 Hz is 0.13 or greater and whose storage elastic modulus at 25° C. and 1 Hz is $8.9 \times 10^4$ Pa or less, is disposed on at least one of the first electrodes and the second electrodes, which comprises the mesh and the insulating layer.

The touch panel employs an adhesive (OCA) having prescribed properties. Since the OCA exhibits an excellent ability of seeping into acute-angled portions, and suitably covers the electrodes where the cells are of a parallelogrammatic shape having acute angles, gaps are unlikely to be formed between the electrodes and the OCA. Therefore, entry of water between the electrodes and the OCA is avoided. Thus, the silver of the fine silver lines is prevented from suffering from ion migration.

On the condition that the fine silver lines, whose visibility is particularly excellent, have a widthwise dimension of 2 μm or less, then the resistance value of the fine silver lines (electrodes) tends to change significantly due to ion migration. According to the present invention, which uses the OCA, even though the electrodes are made up of very fine lines, the resistance value of the electrodes is prevented from changing.

[2] The crossing angles formed by the fine silver lines crossing each other preferably are 70° or less at the opposite angles that are the acute angles of the cells having the parallelogrammatic shape.

[3] The cells having the parallelogrammatic shape preferably are of a lozenge shape.

[4] Adjacent ones of the cells preferably are spaced from each other by a distance of 300 µm or less. Stated otherwise, the cells preferably have a cell pitch of 300 µm or less.

[5] Each of the fine silver lines preferably has a widthwise dimension of 2 µm or less.

[6] Preferred specific examples of the adhesive include the following components (A) through (C) indicated below.

(A): An alkyl(meth)acrylate monomer whose glass transition temperature Tg is 25° C. or lower (the alkyl group has 4 through 18 carbon atoms);

(B): An ester of (meth)acrylate monomer whose glass transition temperature Tg is in excess of 25° C.; and (C): A monomer selected from a group of hydroxyalkyl (meth)acrylate, unsubstituted (meth)acrylamide, N-alkyl-substituted (meth)acrylamide, N,N-dialkyl-substituted (meth)acrylamide, a monomer having a urea functional group, and a monomer having a lactam functional group, a tertiary amine, an alicyclic amine, an aromatic amine, or a combination of these materials.

[7] The adhesive may contain a migration inhibitor comprising a phenolic compound.

[8] The first electrodes or the second electrodes, which comprise the mesh, can be formed by a microcontact printing patterning process or a silver salt process.

The present invention also is concerned with a display device that includes the above touch panel.

Since the touch panel according to the present invention uses the aforementioned adhesive, which exhibits prescribed properties, the silver of the fine silver lines, which function as electrodes with excellent visibility, is prevented from suffering from ion migration, and the resistance value of the electrodes is prevented from changing. Thus, the touch panel exhibits excellent visibility.

The above and other objects, features, and advantages of the present invention will become more apparent from the following description of preferred embodiments when taken in conjunction with the accompanying drawings.

DESCRIPTION OF EMBODIMENTS

A touch panel according to a preferred embodiment of the present invention will be described in detail below with reference to the accompanying drawings. In the following description, the symbol "—(to)" that is used to represent numerical ranges shall be interpreted as including numerical values representative of upper and lower limits of the numerical ranges.

Figure 1:
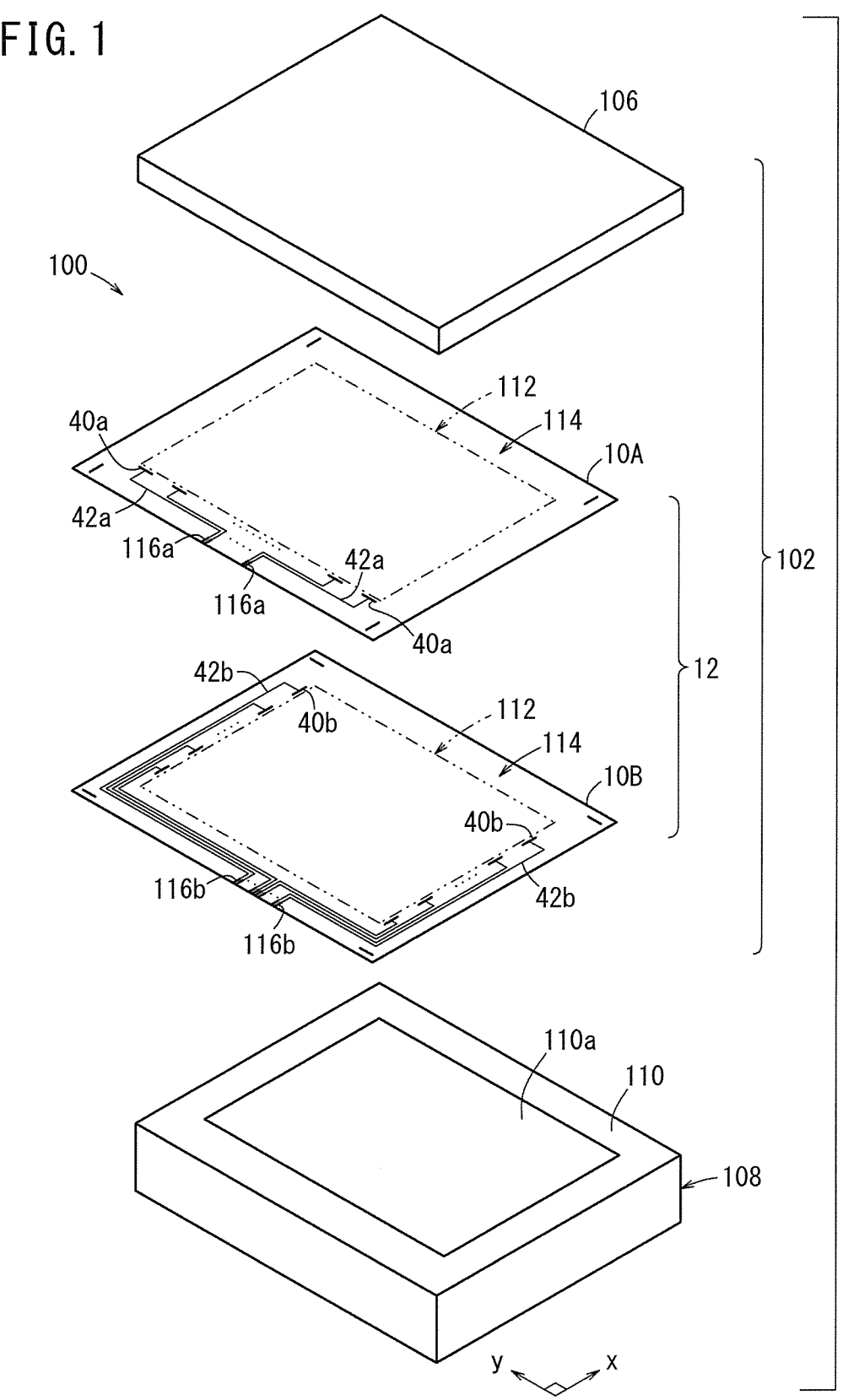
FIG. 1 is an exploded perspective view of a central portion of a touch panel according to an embodiment of the present invention.

FIG. 1 is an exploded perspective view of a central portion of a touch panel 100 according to an embodiment of the present invention. The touch panel 100 includes a main sensor assembly 102 and a non-illustrated control circuit (an IC or the like).

The main sensor assembly 102 includes a laminated electroconductive sheet assembly 12 made up of a first electroconductive sheet 10A and a second electroconductive sheet 10B, which are stacked together, and a protective layer 106 stacked on the first electroconductive sheet 10A. The main sensor assembly 102 (the laminated electroconductive sheet assembly 12 and the protective layer 106) is disposed on a display panel 110 of a display device 108 such as a liquid crystal display or the like, for example. As viewed from above, the main sensor assembly 102 has a touched position sensor area 112 positioned in alignment with a display screen 110a of the display panel 110, and a terminal interconnect area 114 (a so-called frame) disposed in alignment with an outer peripheral region of the display panel 110.

Figure 2:
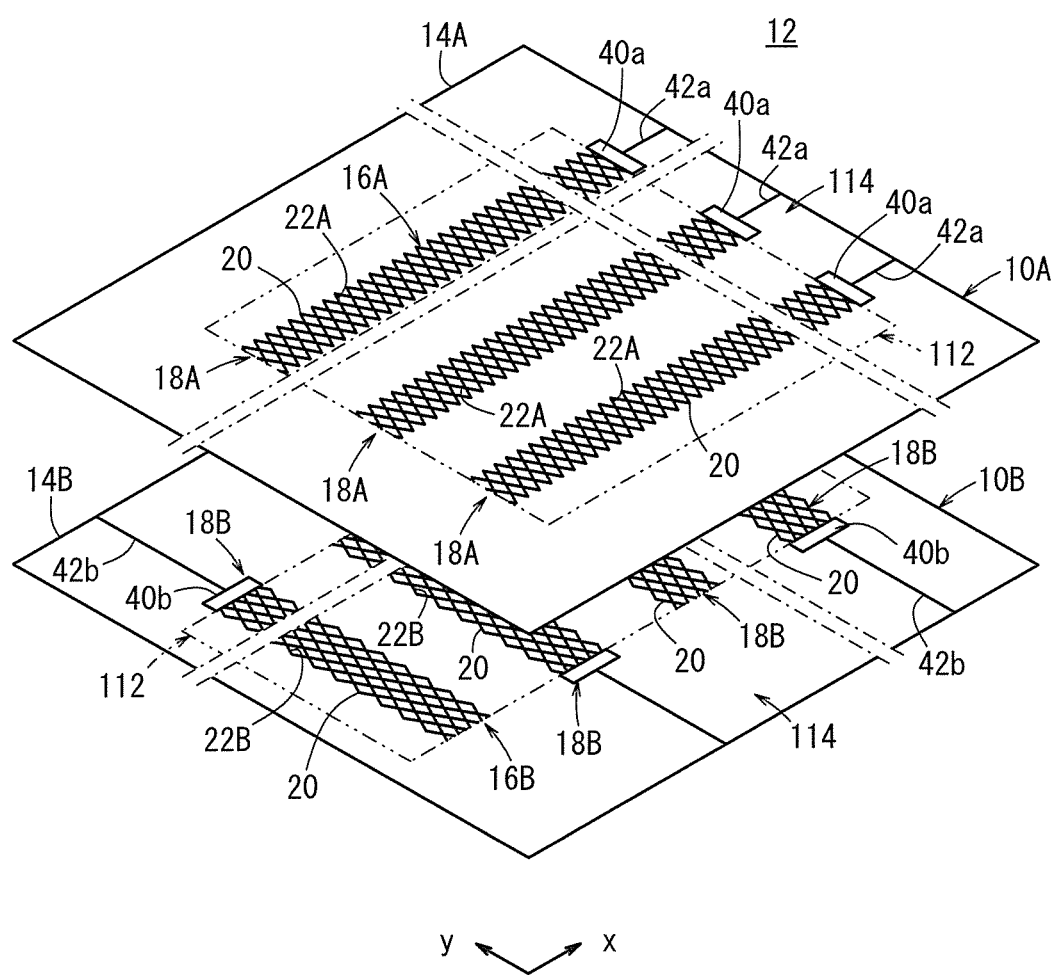
FIG. 2 is a fragmentary exploded perspective view of a laminated electroconductive sheet of the touch panel.

As shown in FIG. 2, the laminated electroconductive sheet assembly 12 is made up of the first electroconductive sheet 10A and the second electroconductive sheet 10B, which are stacked together.

Figure 3:
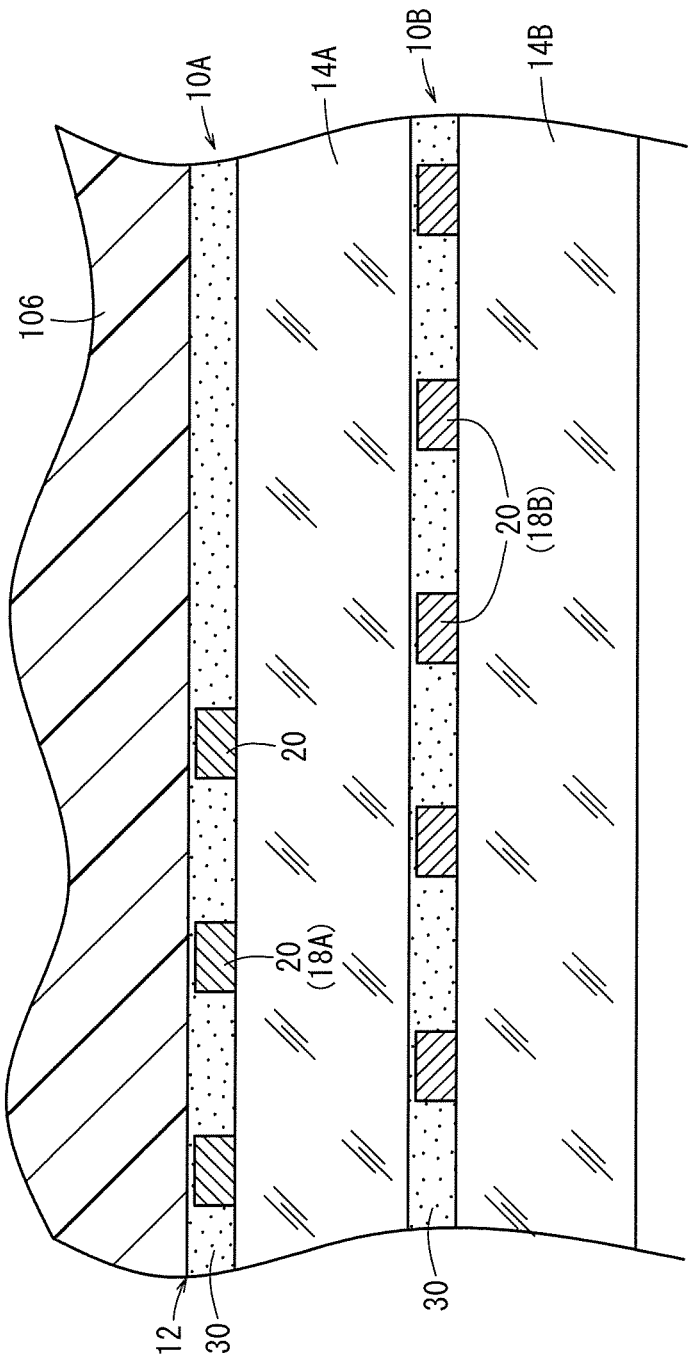
FIG. 3 is a schematic vertical cross-sectional view of the laminated electroconductive sheet.

The first electroconductive sheet 10A has a first electroconductive area 16A, which serves as a first electrode layer, disposed on a principal surface of a first transparent base 14A (see FIG. 3), which serves as an insulating layer. Similarly, as shown in FIGS. 2 and 3, the second electroconductive sheet 10B has a second electroconductive area 16B, which serves as a second electrode layer, disposed on a principal surface of a second transparent base 14B (see FIG. 3), which serves as an insulating layer.

The thickness of the first transparent base 14A and the second transparent base 14B preferably is in a range of 50-350 µm, more preferably, is in a range of 80-250 µm, and particularly preferably, is in a range of 100-200 µm.

Each of the first transparent base 14A and the second transparent base 14B may comprise a plastic film, a plastic plate, a glass plate, or the like.

The plastic film and the plastic plate may be made up of a polyester such as polyethylene terephthalate (PET), polyethylene naphthalate (PEN), or the like, a polyolefin such as polyethylene (PE), polypropylene (PP), polystyrene, EVA, or the like, a vinyl-based resin, polycarbonate (PC), polyamide, polyimide, acrylic resin, triacetyl cellulose (TAC), or the like.

The first transparent base 14A and the second transparent base 14B preferably are made up of a plastic film or a plastic plate, with a melting point equal to or less than approximately 290° C., such as PET (melting point: 258° C.), PEN (melting point: 269° C.), PE (melting point: 135° C.), PP (melting point: 163° C.), polystyrene (melting point: 230° C.), polyvinyl chloride (melting point: 180° C.), polyvinylidene chloride (melting point: 212° C.), or TAC (melting point: 290° C.).

In particular, PET is preferable from the standpoint of light permeability, processability, etc. Since electroconductive films such as the first electroconductive sheet 10A and the second electroconductive sheet 10B are required to be transparent on the condition that they are used as the laminated electroconductive sheet assembly 12, the first transparent base 14A and the second transparent base 14B preferably are highly transparent.

As shown in FIG. 2, the first electroconductive area 16A has a plurality of strip-like first electroconductive patterns 18A (first electrodes), each of which extends in a first direction (x direction). The first electroconductive patterns 18A are arrayed along a second direction (a direction perpendicular to the first direction: y direction).

Each of the first electroconductive patterns 18A is made up of intersecting fine silver lines 20. The intersecting fine silver lines 20 define spaces (interstices), i.e., cells 22A, which are surrounded by the fine silver lines 20.

Figure 4:
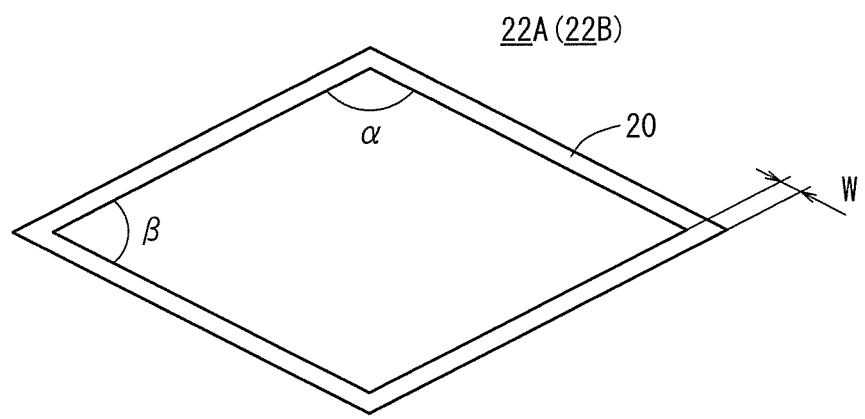
FIG. 4 is a schematic plan view of a cell of a first electrode on the laminated electroconductive sheet.

As shown in FIG. 4, at least one of the cells 22A is lozenge shape with four sides of equal lengths, in particular. Each of the fine silver lines 20 has a widthwise dimension (line width) W that is equal to or less than 4 µm, and more preferably, is equal to or less than 2 µm, thereby improving moire phenomena of the electroconductive patterns caused by the fine silver lines 20, while also improving the appearance of the fine silver lines 20. In order to achieve a certain detection sensitivity for the touch panel 100, the widthwise dimension W of each of the fine silver lines 20 preferably is equal to or greater than 0.5 µm.

The lozenge-shaped cell 22A shown in FIG. 4 has two obtuse angles and two acute angles. Crossing angles α, which are represented by obtuse angles that are opposite each other, are identical to each other and exceed 90°. Further, crossing angles β, which are represented by acute angles, are identical to each other and less than 90°.

The crossing angles β, which are represented by acute angles, preferably are equal to or less than 70°. The crossing angles β, which are equal to or less than 70°, are effective to reduce moire phenomena. However, on the condition that the crossing angles β are too small, moire phenomena are likely to develop. The crossing angles β preferably are in a range of 30° to 70°, and more preferably, are in a range of 45° to 70°.

The distance between adjacent ones of the cells 22A, i.e., the cell pitch (the distance between the centers of gravity of adjacent cells), preferably is equal to or less than 300 µm. Such a cell pitch, which is equal to or less addition to reducing the conspicuousness of the fine silver lines.

As shown in FIG. 2, one end of each of the first electroconductive patterns 18A is connected electrically by a first connector 40a to a first terminal interconnect pattern 42a in the form of a fine silver line 20.

As shown in FIG. 2, the second electroconductive area 16B, which is disposed on a principal surface of the second transparent base 14B (see FIG. 3) of the second electroconductive sheet 10B, has a plurality of strip-like second electroconductive patterns 18B (second electrodes), each of which extends in a second direction (y direction). The second electroconductive patterns 18B are arrayed along the first direction (x direction). Therefore, as shown in FIG. 3, in the laminated electroconductive sheet assembly 12, the first electroconductive patterns 18A and the second electroconductive patterns 18B face each other with the first transparent base 14A interposed therebetween.

Each of the second electroconductive patterns 18B also is formed of intersecting fine silver lines 20. The intersecting fine silver lines 20 define spaces (interstices), i.e., cells 22B, which are surrounded by the intersecting fine silver lines 20.

As with the cells 22A, at least one of the cells 22B is of a parallelogrammatic shape, and preferably is of a lozenge shape with four sides of equal lengths, in particular (see FIG. 4). In the cells 22B, the widthwise dimension W of each of the fine silver lines 20, the crossing angles β, the cell pitch, etc., have numerical values that reside within preferable ranges, which are the same as those for the cells 22A. Therefore, such ranges will not be described in detail.

As shown in FIG. 2, one end of each of the second electroconductive patterns 18B is connected electrically by a second connector 40b to a second terminal interconnect pattern 42b in the form of a fine silver line 20.

As shown in FIG. 2, the first electroconductive sheet 10A, which is applied to the touch panel 100, includes a plurality of the first electroconductive patterns 18A described above, which are arrayed in a portion corresponding to the sensor area 112, and a plurality of first terminal interconnect patterns 42a, each of which is in the form of a fine silver line 20 that extends from respective first connectors 40a, and which are arrayed in the terminal interconnect area 114.

In the example shown in FIG. 1, the first electroconductive sheet 10A has a contour, which is of a rectangular shape as viewed in plan, and the sensor area 112 also has a rectangular shaped contour. A plurality of first terminals 116a are disposed in a longitudinally central area of a peripheral edge portion of the terminal interconnect area 114 on a longer side of the first electroconductive sheet 10A. The first terminals 116a are arrayed longitudinally on the longer side of the first electroconductive sheet 10A. A plurality of first connectors 40a are arrayed linearly along a longer side of the sensor area 112 (a longer side closest to the longer side of the first electroconductive sheet 10A: y direction). The first terminal interconnect patterns 42a, which extend from the respective first connectors 40a, are directed toward a substantially central area of the longer side of the first electroconductive sheet 10A, and are electrically connected to corresponding first terminals 116a.

Therefore, the first terminal interconnect patterns 42a, which are connected to corresponding first connectors 40a on both sides of the longer side of the sensor area 112, have substantially the same length. Consequently, the transfer of signals can be prevented from suffering from a local delay. This leads to an increase in response speed.

As shown in FIG. 2, the second electroconductive sheet 10B has a plurality of second electroconductive patterns 18B, which are arrayed in a portion corresponding to the sensor area 112, and a plurality of second terminal interconnect patterns 42b that extend from respective second connectors 40b, and which are arrayed in the terminal interconnect area 114.

As shown in FIG. 1, a plurality of second terminals 116b are disposed in a longitudinally central area of a peripheral edge portion of the terminal interconnect area 114 on a longer side of the second electroconductive sheet 10B. The second terminals 116b are arrayed longitudinally on the longer side of the second electroconductive sheet 10B. A plurality of second connectors 40b (e.g., odd-numbered second connectors 40b) are arrayed linearly along a shorter side of the sensor area 112 (a shorter side closest to the shorter side of the second electroconductive sheet 10B: x direction), and a plurality of second connectors 40b (e.g., even-numbered second connectors 40b) are arrayed linearly along another shorter side of the sensor area 112 (a shorter side closest to the other shorter side of the second electroconductive sheet 10B: x direction).

Among the plurality of second electroconductive patterns 18B, odd-numbered second electroconductive patterns 18B, for example, are connected to corresponding odd-numbered second connectors 40b, and even-numbered second electroconductive patterns 18B are connected to corresponding even-numbered second connectors 40b. The second terminal interconnect patterns 42b, which extend from respective odd-numbered second connectors 40b, and the second terminal interconnect patterns 42b, which extend from respective even-numbered second connectors 40b, are directed toward a substantially central area of one longer side of the second electroconductive sheet 10B, and are connected electrically to corresponding second terminals 116b. Therefore, the first and second terminal interconnect patterns 42b, for example, have substantially the same length. Similarly, the (2n−1)th and (2n)th second terminal interconnect patterns 42b have substantially the same length. Inasmuch as the second terminals 116b are disposed in a longitudinally central area of one longer side of the second electroconductive sheet 10B, the transfer of signals is prevented from suffering from a local delay. This leads to an increase in response speed.

The first terminal interconnect patterns 42a may extend in the same manner as the above-described second terminal interconnect patterns 42b, or conversely, the second terminal interconnect patterns 42b may extend in the same manner as the above-described first terminal interconnect patterns 42a.

On the condition that the laminated electroconductive sheet assembly 12 is used as the touch panel 100, the protective layer 106 is provided on the first electroconductive sheet 10A. The first terminal interconnect patterns 42a, which extend from the plurality of first electroconductive patterns 18A of the first electroconductive sheet 10A, and the second terminal interconnect patterns 42b, which extend from the plurality of second electroconductive patterns 18B of the second electroconductive sheet 10B, are connected to a control circuit that controls a scanning process, for example.

A touched position preferably is detected using a self capacitance process or a mutual capacitance process. More specifically, according to the self capacitance process, voltage signals for detecting a touched position are supplied successively to the first electroconductive patterns 18A, and voltage signals for detecting a touched position are supplied successively to the second electroconductive patterns 18B. In a case where a fingertip is brought into contact with or into proximity with the upper surface of the protective layer 106, the capacitance between the first electroconductive pattern 18A and the second electroconductive pattern 18B, which face the touched position and GND (ground), increases. At this time, signal waveforms, which are transmitted from the first electroconductive pattern 18A and the second electroconductive pattern 18B, become different from signal waveforms that are transmitted from the other electroconductive patterns. Therefore, based on the signals that are transmitted from the first electroconductive pattern 18A and the second electroconductive pattern 18B, the control circuit can calculate the touched position.

According to the mutual capacitance process, voltage signals for detecting a touched position are supplied successively to the first electroconductive patterns 18A, for example, and a sensing process (for detecting a transmitted signal) is performed successively on the second electroconductive patterns 18B. In a case where a fingertip is brought into contact with or into proximity with the upper surface of the protective layer 106, a stray capacitance of the finger is added in parallel with the parasitic capacitance between the first electroconductive pattern 18A and the second electroconductive pattern 18B, which face the touched position. At this time, signal waveforms, which are transmitted from the second electroconductive pattern 18B, become different from the signal waveforms that are transmitted from the other second electroconductive patterns 18B. Therefore, based on a sequence of the first electroconductive patterns 18A to which the voltage signals are supplied and the supplied signal transmitted from the second electroconductive pattern 18B, the control circuit can calculate the touched position.

The self capacitance process or the mutual capacitance process, which is employed in the foregoing manner as a process for detecting a touched position, is capable of detecting touched positions in a case where two fingertips are brought simultaneously into contact with or into proximity with the upper surface of the protective layer 106. Background art documents concerning projection-type electrostatic capacitance type detection circuits include U.S. Pat. Nos. 4,582,955, 4,686,332, 4,733,222, 5,374,787, 5,543,588, 7,030,860, and U.S. Patent Application Publication No. 2004/0155871.

In order to obtain patterns of reduced line width to serve as the first electroconductive patterns 18A and the second electroconductive patterns 18B, a microcontact printing patterning process or a silver salt process preferably is used. For repeatedly obtaining a large number of random patterns, the silver salt process, which does not use a wearable stamp, is particularly preferred.

The microcontact printing patterning process is a process for obtaining patterns of reduced line width on the basis of a microcontact printing process. Such a microcontact printing process is a process for fabricating a pattern of a monomolecular film by bringing a thiol solution, which functions as an ink, into contact with a gold base, using an elastic stamp of polydimethylsiloxane (see Angew. Chem. Int. Ed., p. 550, vol. 37, 1998, written by Whitesides).

A typical process sequence of the microcontact printing patterning process is carried out in the following manner. First, a base is coated with a metal (e.g., a PET base is sputter-coated with silver).

Thereafter, according to the microcontact printing process, a mask made up of a monomolecular film is stamped onto the metal-coated base. Thereafter, metal is etched away from the metal-coated base, except for the pattern that resides under the mask.

Specific working details of the microcontact printing patterning process are described in paragraph [0104] of Japanese Laid-Open Patent Publication No. 2012-519329 (PCT).

The silver salt process obtains a mesh-like pattern of fine silver lines 20 by exposing to light and developing a photosensitive material having a photosensitive layer containing a silver salt. Specific working details of the silver salt process are described in paragraphs [0163] through [0241] of Japanese Laid-Open Patent Publication No. 2009-004348.

As shown in FIG. 3, an OCA 30, which serves as an adhesive, is disposed by being applied in the form of an adhesive sheet to an upper end surface of the second electroconductive sheet 10B (the second electroconductive patterns 18B and the second transparent base 14B) and an upper end surface of the first electroconductive sheet 10A (the first electroconductive patterns 18A and the first transparent base 14A).

The OCA 30 has a loss coefficient tan δ of 0.13 or greater at 140° C. and 1 Hz. According to the following equation (1), the loss coefficient is determined as a ratio of a loss elastic modulus and a storage elastic modulus.

Loss coefficient (tan δ)=loss elastic modulus/storage elastic modulus (1)

The storage elastic modulus of the OCA 30 at 25° C. and 1 Hz is $8.9 \times 10^4$ Pa or less.

The aforementioned dynamic viscoelastic characteristics are important from the standpoint of seepage into the acute-angled portions of the cells, as well as conformability with the concavo-convex surfaces (step conformability).

On the condition that the value of tan δ, as an index of stress relaxation, is 0.13 or greater, then the OCA 30 tends to exhibit an excellent stress relaxation capability, and seeps into the acute-angled portions of the cells in conformity with the concavo-convex surfaces. The value of tan δ preferably is 0.15 or greater, and more preferably, is 0.20 or greater. However, on the condition that the value of tan δ becomes excessively large, then the adhesiveness of the OCA 30 at high temperatures tends to decrease. To avoid such a reduction in adhesiveness, the value of tan δ should be 0.60 or less.

The storage elastic modulus represents an index of residual stress (initial residual stress) of the OCA 30, which is deformed in the case of application to the fine silver lines. On the condition that the value of the storage elastic modulus is $8.9 \times 10^4$ Pa or less, then the conformability with the concavo-convex surfaces (step conformability) is better. For example, even on the condition that the OCA 30 is applied to the fine silver lines in an acute-angled cell shape pattern having concavo-convex surfaces of approximately 1 μm, the OCA 30 can seep fully into the acute-angled portions of the cells, and is capable of preventing water in the ambient air from entering into the laminated electroconductive sheet assembly 12, thereby making it possible to suppress ion migration. The storage elastic modulus preferably is $8.0 \times 10^4$ Pa or less.

On the condition that the storage elastic modulus is smaller, the adhesiveness of the OCA 30 also becomes lower. To avoid a reduction in adhesiveness, the storage elastic modulus preferably is $2.5 \times 10^4$ Pa or greater.

Particularly preferably, the dynamic viscoelastic characteristics of the OCA 30 should be such that tan δ lies within a range from 0.20 to 0.60, and the storage elastic modulus lies within a range from $2.5 \times 10^4$ Pa to $8.0 \times 10^4$ Pa. On the condition that the dynamic viscoelastic characteristics reside within such ranges, seepage of the OCA 30 into the acute-angled portions of the cells, the conformability of the OCA 30 with respect to the concavo-convex surfaces (step conformability), and the adhesiveness of the OCA 30 are enhanced, thereby increasing the ability to prevent ion migration.

The OCA 30 having such properties preferably contains the following components (A) through (C) for preventing both ion migration and whitening.

(A): An alkyl(meth)acrylate monomer whose glass transition temperature Tg is 25° C. or lower (the alkyl group has 4 through 18 carbon atoms);

(B): An ester of (meth)acrylate monomer whose glass transition temperature Tg is in excess of 25° C.; and (C): A monomer selected from a group of hydroxyalkyl (meth)acrylate, unsubstituted (meth)acrylamide, N-alkyl-substituted (meth)acrylamide, N,N-dialkyl-substituted (meth)acrylamide, a monomer having a urea functional group, and a monomer having a lactam functional group, a tertiary amine, an alicyclic amine, an aromatic amine, or a combination of these materials.

Component (A), i.e., alkyl(meth)acrylate monomer whose alkyl group has 4 through 18 carbon atoms, preferably is such that the glass transition temperature of a polymer of one or plural monomers is 25° C. or less, in terms of the fact that component (A) alone imparts sufficient adhesiveness (flexibility) to the OCA 30. More specifically, such a monomer, in which the glass transition temperature of a homopolymer is 25° C. or less, may be selected, for example, from among alkyl(meth)acrylates such as n-butyl acrylate, isobutyl acrylate, isoamyl acrylate, hexyl acrylate, cyclohexyl acrylate, 2-ethylhexyl(meth)acrylate, isooctyl(meth)acrylate, isononyl(meth)acrylate, n-decyl(meth)acrylate, isodecyl (meth)acrylate, lauryl(meth)acrylate, isomyristyl(meth) acrylate, isocetyl(meth)acrylate, 2-octyldecyl(meth)acrylate, isostearyl(meth)acrylate, 2-methylbutyl acrylate, or the like, or a mixture thereof.

Among these materials, a preferable component (A) is alkyl acrylate, since alkyl acrylate exhibits excellent polymerizability according to either a thermal polymerization process or an optical polymerization process. More specifically, alkyl acrylate includes n-butyl acrylate, isobutyl acrylate, 2-ethylhexyl acrylate, isooctyl acrylate, isononyl acrylate, isodecyl acrylate, lauryl acrylate, isomyristyl acrylate, isocetyl acrylate, 2-octyldecyl acrylate, isostearyl acrylate, 2-methylbutyl acrylate, or the like. From the standpoint of adhesiveness, 2-ethylhexyl acrylate, isooctyl acrylate, and 2-methylbutyl acrylate are particularly preferable.

The "glass transition temperature (Tg)" of a homopolymer refers to a value measured according to JIS K 7121. In a case where a polymer, which has been heated and melted, is cooled under certain conditions, the polymer changes through a supercooled liquid state into a glass state. The glass transition temperature refers to the temperature at which the state of the polymer changes.

Component (B), i.e., an ester of (meth)acrylate monomer whose glass transition temperature Tg is in excess of 25° C., may be a linear or branched alkyl(meth)acrylate, such as methyl(meth)acrylate, ethyl(meth)acrylate, t-butyl(meth) acrylate, n-butyl methacrylate, isobutyl methacrylate, or the like, or an alicyclic alkyl(meth)acrylate such as cyclohexyl methacrylate, 4-t-butylcyclohexyl(meth)acrylate, isobornyl (meth)acrylate, or the like. Among these materials, methyl (meth)acrylate, ethyl(meth)acrylate, and isobornyl(meth) acrylate are particularly preferable.

Component (C) is a component for increasing the cohesion force of the OCA 30 in order to impart adhesiveness thereto. On the touch panel 100, the component (C) prevents foaming and peeling, particularly at high temperatures.

Monomers of this type include, for example, substituted acrylamide such as 2-hydroxyethyl(meth)acrylate, 3-hydroxypropyl(meth)acrylate, N,N-dimethyl(meth)acrylamide, N,N-diethyl(meth)acrylamide, N-t-butyl(meth)acrylamide, N,N-isopropyl(meth)acrylamide, (meth)acrylamide, N,N-dimethylaminopropyl(meth)acrylamide, diacetone acrylamide, or the like, and vinyl monomers such as N-vinylpyrrolidone, N-vinylcaprolactam, or the like. Among these materials, 2-hydroxyethyl(meth)acrylate and 3-hydroxypropyl(meth)acrylate are particularly preferable.

The tan δ value and the storage elastic modulus of the OCA 30 may be adjusted by appropriately changing the type, molecular weight, and composition of the above monomer components. For example, on the condition that component (C) is used in a large amount, then the storage elastic modulus becomes high, whereas on the condition that component (A) and component (B) are used in large amounts, then the storage elastic modulus becomes low. On the condition that the molecular weight of a copolymer made up of monomers containing component (A), component (B), and component (C) is increased, then the storage elastic modulus also tends to increase. Generally speaking, component (A) having a proportion represented by 45 to 95 parts by weight, component (B) having a proportion represented by 20 to 50 parts by weight, and component (C) having a proportion represented by 1 to 40 parts by weight are preferable, so as to prevent both ion migration and whitening, in particular.

The tan δ value of the OCA 30 may also be adjusted by adjusting the amount of a cross-linking agent, as will be described later. More specifically, on the condition that the amount of the cross-linking agent is increased, the tan δ value is reduced, whereas on the condition that the amount of the cross-linking agent is reduced, the tan δ value is increased.

An OCA 30 having the above properties exhibits good seepage into the acute-angled portions of the cells, good conformability with the steps, and good adhesiveness. Further, since the OCA 30 sufficiently covers the first electroconductive patterns 18A and the second electroconductive patterns 18B, gaps are unlikely to be formed between the first electroconductive patterns 18A and the second electroconductive patterns 18B.

Therefore, it becomes difficult for water to find its way between the first electroconductive patterns 18A or the second electroconductive patterns 18B and the OCA 30. Consequently, silver migration is unlikely to occur. Despite the facts that the cell pitch is small, the widthwise dimension W of the fine silver lines 20 is small, and the cells 22A, 22B are of a lozenge shape having acute-angled portions, the resistance values of the fine silver lines 20 are effectively prevented from changing, and the fine silver lines 20 are prevented from becoming broken.

The OCA 30 may further contain a migration inhibitor made of a phenolic compound. An OCA 30 that contains such a migration inhibitor is more effective to prevent silver migration from occurring.

The term phenolic compound implies a compound that contains a phenolic group in molecules. Such a compound suppresses ion migration by reducing silver ions to metal silver.

The phenolic compound preferably has a redox potential within a range of 0.40 to 1.30 V. For improving the ability to prevent ion migration, the phenolic compound more preferably has a redox potential that lies within a range of 0.50 to 1.20 V, much more preferably, within a range of 0.55 to 1.1 V, and particularly preferably, within a range of 0.55 to 1.0 V. On the condition that the redox potential of the reducing compound is less than 0.40 V or greater than 1.30 V, the reducing compound exhibits a poor ability to prevent ion migration.

The phenolic compound is not limited to any particular type. However, for a better ability to prevent ion migration, the phenolic compound types preferably have a redox potential in the range of 0.1 to 1.0 V, more preferably, in the range of 0.1 to 0.9 V, and much more preferably, in the range of 0.15 to 0.7 V.

The redox potential can be measured by methods described in many documents. According to the present invention, a value measured by the method described below will be defined as a redox potential.

More specifically, a dimethylformamide (DMF) solution containing 1 mM of a reducing compound and 0.1 M of tetrabutylammonium perchlorate as a supporting electrolyte is bubbled with Ar for 5 minutes. Thereafter, cyclic voltammetry is performed on the solution by a potentiostat (ALS-604A, BAS Inc.). The redox potential is measured using a working electrode made of glassy carbon, a counter electrode made of Pt, and a reference electrode made up of a saturated calomel electrode.

Compounds represented by the following Formulas (1) through (3) may be cited as preferred specific examples of the phenolic compound.

[Chem. 1]

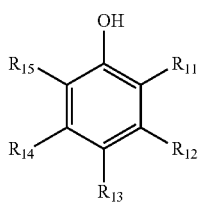

Formula (1)

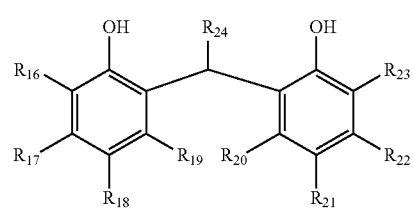

Formula (2)

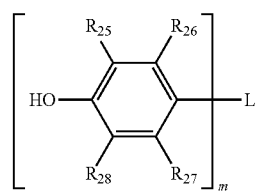

Formula (3)

In Formula (1), $R_{11}$ to $R_{15}$ individually represent a hydrogen atom, a hydroxyl group, or a hydrocarbon group, whose carbon number ranges from 1 to 20 with or without a heteroatom.

A preferred example of the hydrocarbon group is —O—$R_{31}$, for example, where $R_{31}$ represents a hydrocarbon group whose carbon number ranges from 1 to 20, and which may contain heteroatoms. On the condition that there are a plurality of —O—$R_{31}$ hydrocarbon groups, then the groups may be identical to or different from each other.

The carbon number of the hydrocarbon group preferably lies within a range of 1 to 12, and more preferably, lies within a range of 1 to 10, for enhancing compatibility with insulating resins.

More specifically, the hydrocarbon group may be an aliphatic hydrocarbon group, an aromatic hydrocarbon group, or a group having a combination of these groups. The aliphatic hydrocarbon group may be linear, a branched-chain, or cyclic.

The total of the molecular weights of the groups $R_{11}$ to $R_{15}$ is 21 or greater, and preferably, is 35 or greater. Although the total of the molecular weights is not limited to any particular upper limit, the upper limit preferably is 1000 or less, more preferably, is 500 or less, and much more preferably, is 300 or less.

Any two of the groups $R_{11}$ to $R_{15}$ may be combined in a ring structure. For example, two adjacent groups, such as $R_{11}$ and $R_{12}$, $R_{12}$ and $R_{13}$, $R_{13}$ and $R_{14}$, or $R_{14}$ and $R_{15}$, may be combined in a ring structure. The ring, which is formed in this manner, is not limited to any particular type, but may be a 5- or 6-membered ring, for example.

In Formula (2), $R_{16}$ to $R_{23}$ individually represent a hydrogen atom, a hydroxyl group, or a hydrocarbon group whose carbon number ranges from 1 to 20 with or without a heteroatom.

A preferred range of the hydrocarbon groups that are represented by $R_{16}$ to $R_{23}$ is the same as the preferred range of the aforementioned hydrocarbon groups that are represented by $R_{11}$ to $R_{15}$.

The total of the molecular weights of the groups $R_{16}$ to $R_{23}$ is 24 or greater, and preferably, is 35 or greater. Although the total of the molecular weights is not limited to any particular upper limit, the upper limit preferably is to 1000 or less, more preferably, is 500 or less, and much more preferably, is 300 or less. Any two of the groups $R_{16}$ to $R_{23}$ may be combined in a ring structure.

$R_{24}$ represents a hydrogen atom or a hydrocarbon group whose carbon number ranges from 1 to 20 with or without a heteroatom.

In Formula (3), $R_{25}$ to $R_{28}$ individually represent a hydrogen atom, a hydroxyl group, or a hydrocarbon group whose carbon number ranges from 1 to 20 with or without a heteroatom.

A preferred range of the hydrocarbon groups that are represented by $R_{25}$ to $R_{28}$ is the same as the preferred range of the aforementioned hydrocarbon groups that are represented by $R_{11}$ to $R_{15}$.

The total of the molecular weights of the groups $R_{25}$ to $R_{28}$ is 40 or greater, and more preferably, is 50 or greater. Although the total of the molecular weights is not limited to any particular upper limit, the upper limit thereof preferably is 1000 or less, more preferably, is 500 or less, and much more preferably, is 300 or less.

Any two of the groups $R_{25}$ to $R_{28}$ may be combined in a ring structure.

L represents a bivalent or trivalent hydrocarbon group, which may have heteroatoms, —S—, or a group based on a combination of such groups. The carbon number of the bivalent hydrocarbon group preferably lies within a range of 1 to 12, and more preferably, lies within a range of 1 to 10, for enhancing compatibility with insulating resins. The variable m represents an integer of 2 or 3.

A preferred form of $R_{13}$ in Formula (1) and $R_{18}$ and $R_{21}$ in Formula (2) may be a group that is represented by the following Formula (4) shown below.

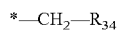  Formula (4):

In Formula (4), $R_{34}$ represents a hydrogen atom or a hydrocarbon group having a carbon number that lies within a range of 1 to 19. The carbon number of the hydrocarbon group, which is represented by $R_{34}$, preferably lies within a range of 1 to 12, and more preferably, lies within a range of 1 to 10, for enhancing compatibility with insulating resins. In Formula (4), the asterisk represents a bond position.

For improving the ability to prevent ion migration, the compound represented by the following Formula (5) may be cited as a preferred example of the phenolic compound.

[Chem. 2]

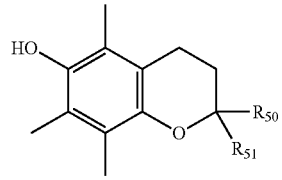

Formula (5)

In Formula (5), $R_{50}$, $R_{51}$ individually represent a hydrogen atom, a hydroxyl group, or an aliphatic hydrocarbon group which may contain an oxygen atom, or an aromatic hydrocarbon group that may contain an oxygen atom. For improving the ability to prevent ion migration, at least one of $R_{50}$ or $R_{51}$ preferably is an alkyl group containing tertiary or quaternary carbon atoms.

The number of carbon atoms contained within the aliphatic hydrocarbon group or the aromatic hydrocarbon group is not particularly limited, but preferably lies within a range of 1 to 20. In particular, $R_{50}$ preferably is an alkyl group in which the number of carbon atoms lies within a range of 1 to 5, and $R_{51}$ preferably is an alkyl group in which the number of carbon atoms lies within a range of 10 to 20.

The total of the molecular weights of the hydrocarbon group contained in the groups $R_{50}$, $R_{51}$ preferably is 30 or greater, and more preferably, is 50 or greater. On the condition that the total number of carbon atoms falls within this range, the ability to prevent silver ion migration is increased.

The compounds indicated below may be cited as examples of the phenolic compound.

[Chem. 3]

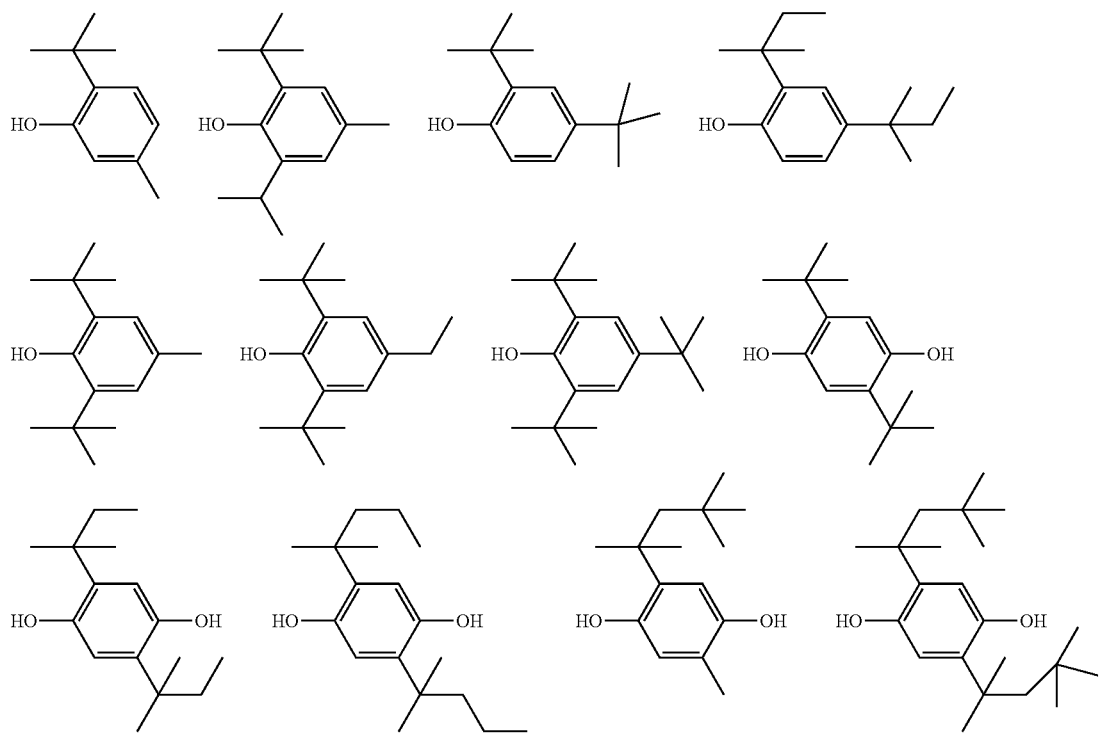

-continued
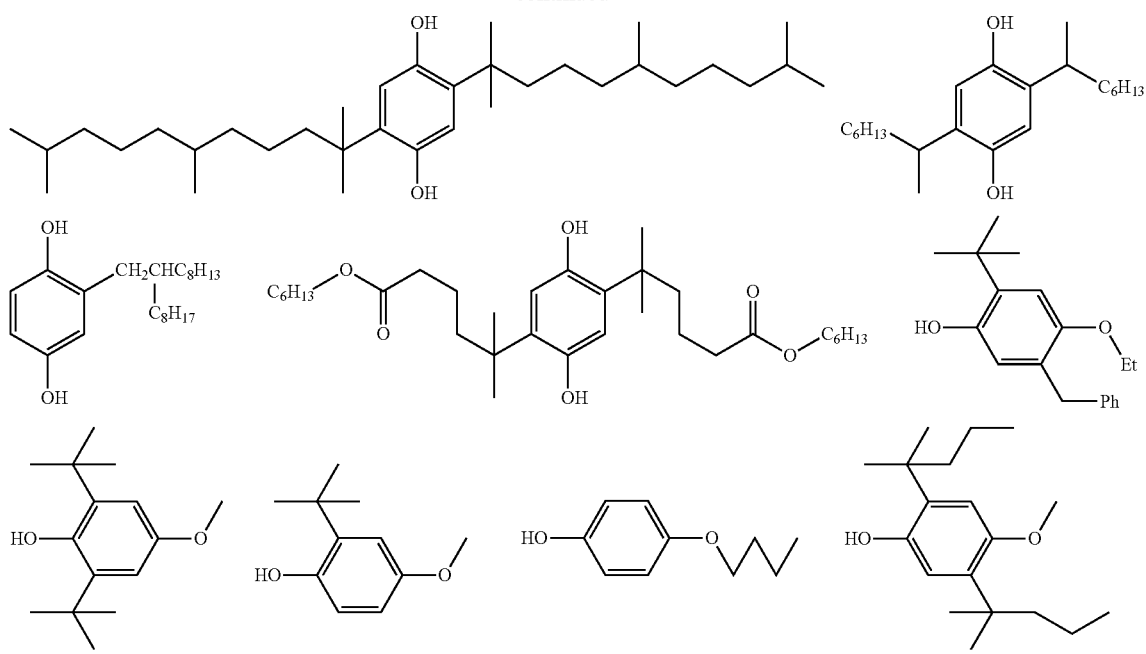
[Chem. 4]
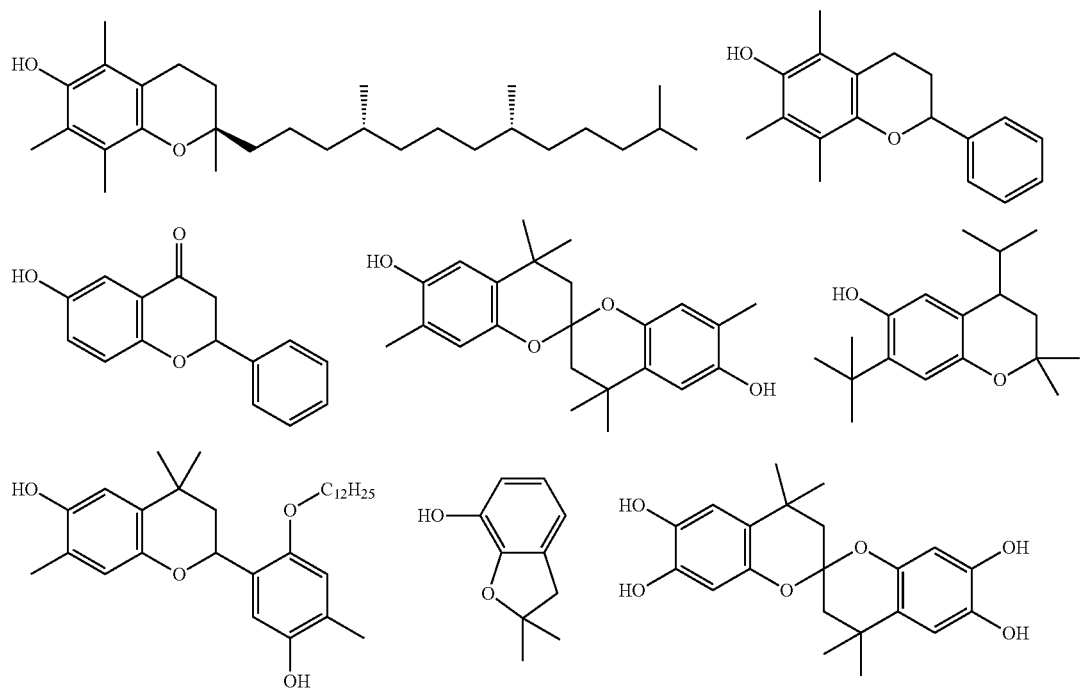
[Chem. 5]
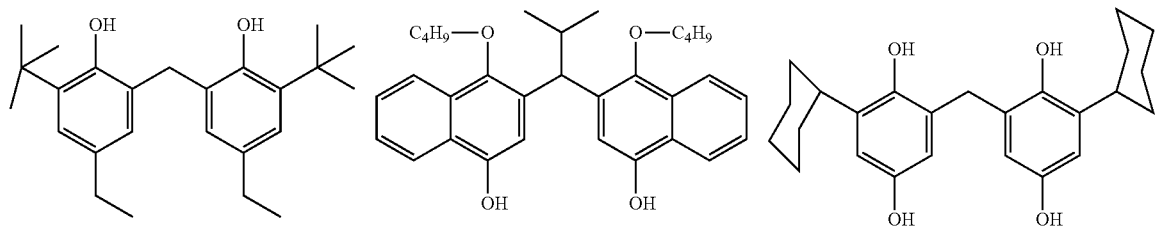

-continued
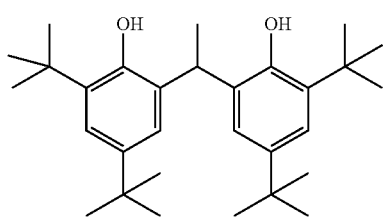
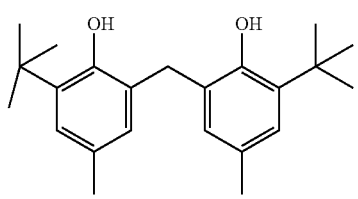
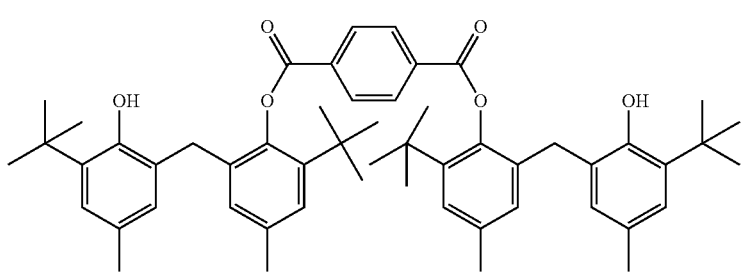
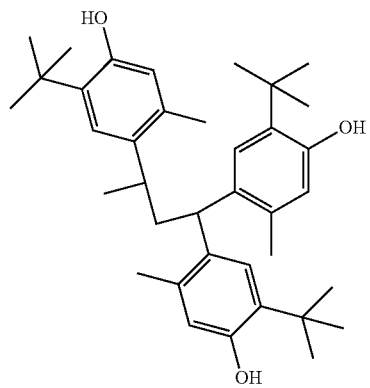
[Chem. 6]
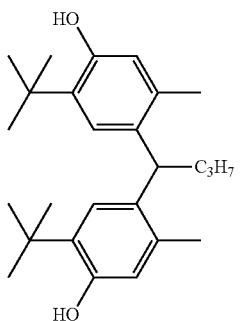
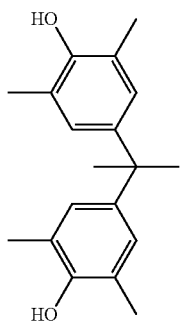
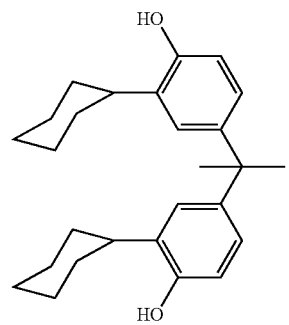
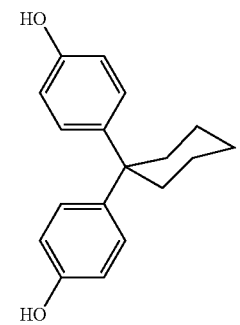
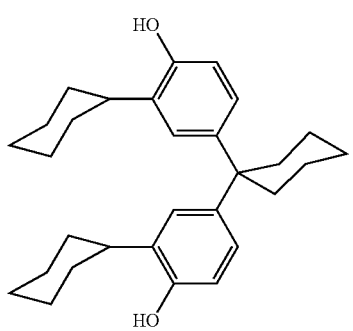
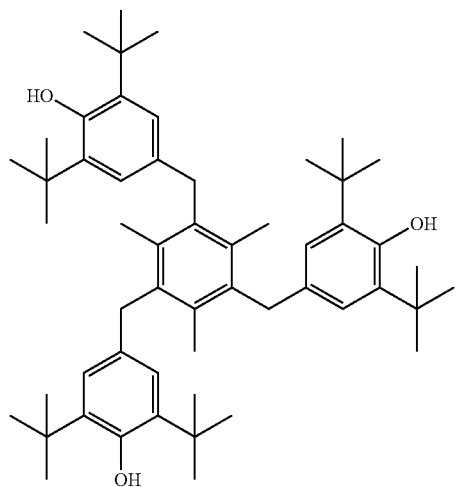
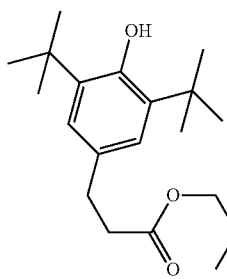
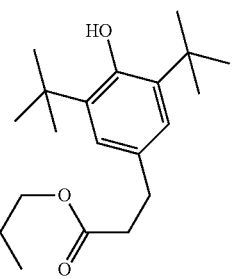
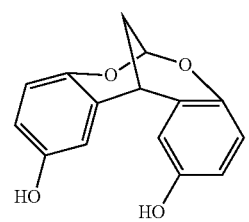

-continued
[Chem. 7]
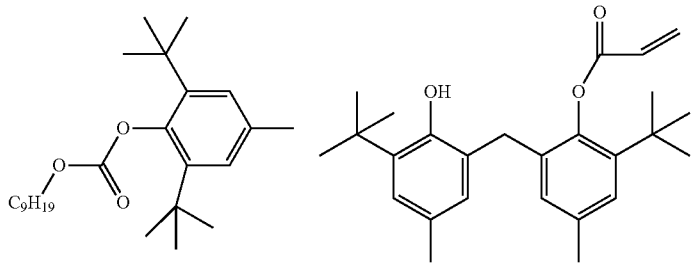
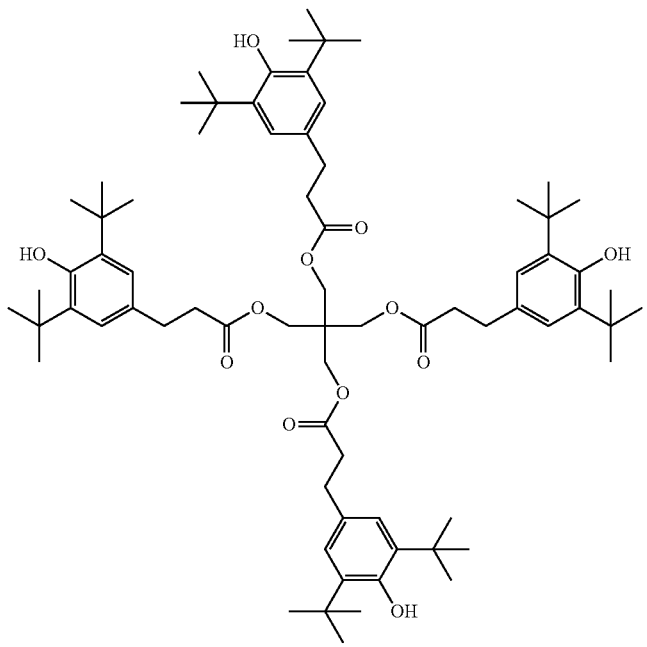
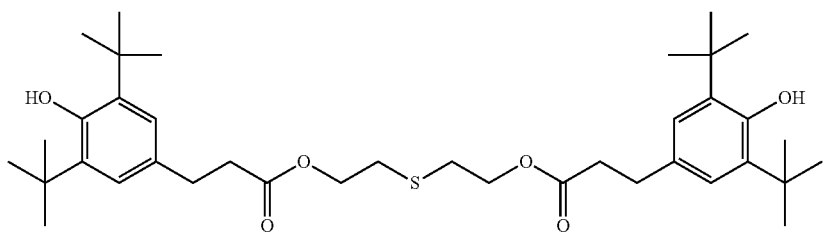
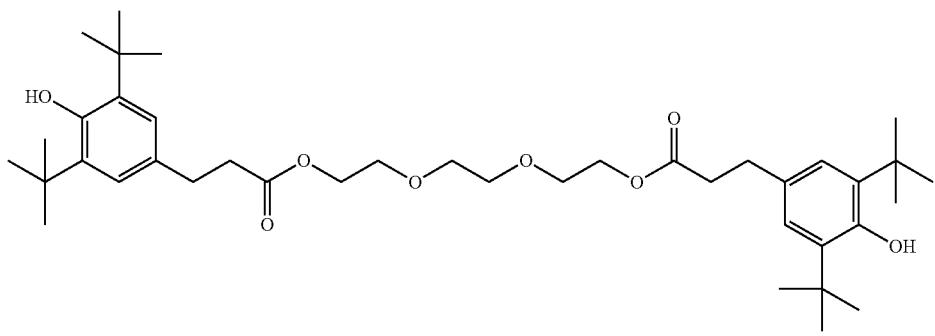

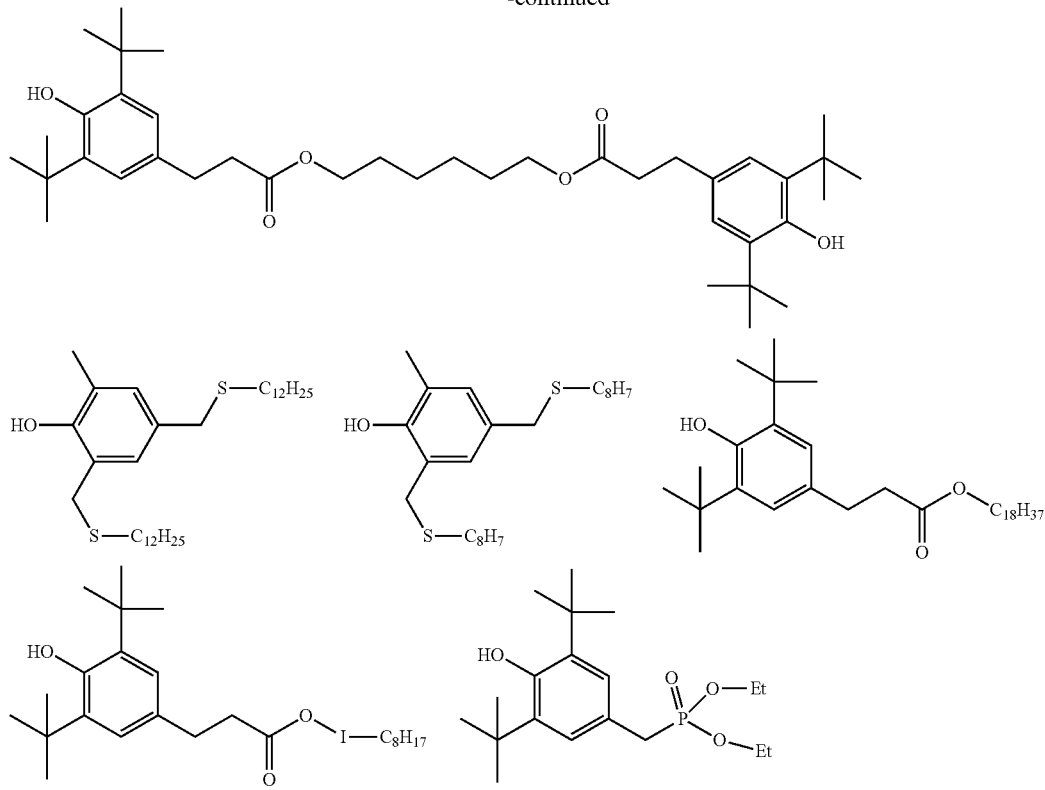

In addition to or instead of the phenolic compound, the OCA 30 may contain a heterocyclic compound having a mercapto group (—SH) (a SH-group-containing heterocyclic compound) as a migration inhibitor. The heterocyclic compound suppresses ion migration by trapping silver ions with a heteroatom contained in the mercapto group and the heterocyclic part.

The heterocyclic compound is a cyclic compound having at least one heteroatom. The term heteroatom implies an atom other than a carbon atom and a hydrogen atom. Further, the term heteroatom implies only an atom forming a part of a cyclic system of the heterocycle, and implies nether an atom that is positioned outside of the cyclic system or separated from the cyclic system by at least one unconjugated single bond, nor an atom that forms a part of a further substituted group of the cyclic system. There is no particular upper limit on the number of heteroatoms, but the number of heteroatoms preferably is 10 or less, more preferably, is 6 or less, and particularly preferably, is 4 or less.

Any SH-group-containing heterocyclic compounds that satisfy the above requirements may be used. However, the heteroatom preferably is a nitrogen atom, a sulfur atom, an oxygen atom, a selenium atom, a tellurium atom, a phosphorus atom, a silicon atom, or a boron atom, more preferably, is a nitrogen atom, a sulfur atom, or an oxygen atom, and particularly preferably, is a nitrogen atom or a sulfur atom.

The number of ring members of the heterocycle is not limited. However, the heterocycle preferably is a 4-through 10-membered ring, more preferably, is a 5-through 9-membered ring, and much more preferably, is a 5- or 6-membered ring.

The heterocycle may be either aromatic or non-aromatic, but preferably is an aromatic heterocycle.

The configuration of the heterocycle may be either a monocycle or a condensed cycle, but preferably is a heterocycle comprising one or two aromatic rings.

Specific examples of the heterocycle include a pyrrole ring, a thiophene ring, a furan ring, an imidazole ring, a pyrazole ring, a triazole ring, an isothiazole ring, an oxazole ring, an isoxazole ring, a pyridine ring, a pyrazine ring, a pyrimidine ring, a pyridazine ring, an indolizine ring, a triazole ring, an oxadiazole ring, a thiadiazole ring, a triazaindene ring, a tetraazaindene ring, a pentaazaindene ring, a hexaazaindene ring, a purine ring, a tetrazole ring, a pyrazotriazole ring, a pyrrolotriazole ring, and an indole ring, a benzofuran ring, a benzothiophene ring, an isobenzofuran ring, a quinolizine ring, a quinoline ring, a phthalazine ring, a quinoxaline ring, an isoquinoline ring, a carbazole ring, a phenanthridine ring, a phenanthroline ring, an acridine ring, and a benzotriazole ring, which are benzo-condensed to the above rings, and a pyrrolidine ring, a pyrroline ring, an imidazoline ring, and the like, in which the above rings are partially or fully saturated. However, the heterocycle is not limited to the above rings.

The SH-group-containing heterocyclic compound includes a mercapto group. Such a mercapto group is highly reactive for generating a covalent bond with silver. The mercapto group is bonded to the above-described heterocycle.

The amount of the mercapto group included within the SH-group-containing heterocyclic compound is not particularly limited. However, since the dispersibility of the SH-group-containing heterocyclic compound is better in insulating resins, the ratio of the total atomic weight of the mercapto group to the entire molecular weight of the compound preferably is 50% or less, and more preferably, is 40% or less.

A plurality of mercapto groups may be included, and not just a single mercapto group.

The SH-group-containing heterocyclic compound may have a substituted group other than a mercapto group. For example, the substituted group may be a halogen atom, an alkyl group, an alkenyl group, an alkynyl group, an aryl group, a cyano group, a hydroxyl group, a nitro group, a carboxyl group, an alkoxy group, an aryloxy group, a syliloxy group, an acyloxy group, a carbamoyloxy group, an alkoxycarbonyloxy group, an aryloxycarbonyloxy group, an amino group, an ammonio group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an imide group, a phosphino group, a phosphinyl group, a phosphinyloxy group, a phosphinylamino group, a phosphino group, a silyl group, a hydrazino group, a ureido group, a boronate group (—B(OH)$_2$), a phosphato group (—OPO(OH)$_2$), a sulphato group (—OSO$_3$H), or the like.

The present invention is not limited to the embodiment described above. Various changes may be made thereto without departing from the spirit of the present invention.

Figure 5:
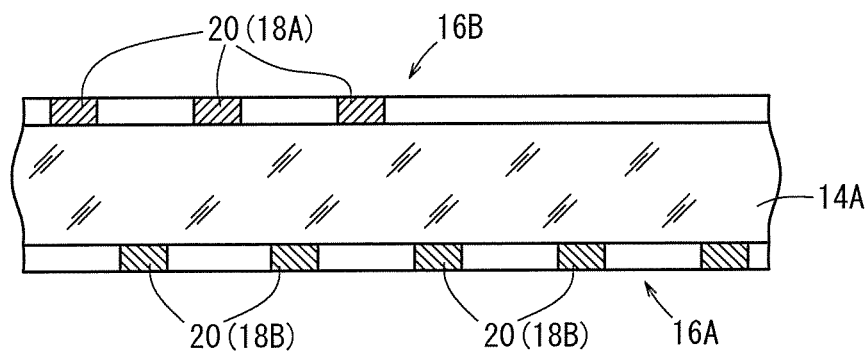
FIG. 5 is a schematic vertical cross-sectional view of a laminated electroconductive sheet according to another embodiment of the present invention, which differs from the laminated electroconductive sheet shown in FIG. 3.

For example, as shown in FIGS. 2 and 3, the laminated electroconductive sheet assembly 12 includes the first electroconductive area 16A on one principal surface of the first transparent base 14A and the second electroconductive area 16B on one principal surface of the second transparent base 14B, and the first electroconductive area 16A and the second electroconductive area 16B are stacked on each other. However, as shown in FIG. 5, the first electroconductive area 16A may be disposed on one principal surface of the first transparent base 14A, and the second electroconductive area 16B may be disposed on another principal surface of the first transparent base 14A. In this case, the second transparent base 14B does not exist, the first transparent base 14A is stacked on the second electroconductive area 16B, and the first electroconductive area 16A is stacked on the first transparent base 14A.

Another layer may be provided between the first electroconductive sheet 10A and the second electroconductive sheet 10B. On the condition that an insulating layer is interposed between the first electroconductive area 16A and the second electroconductive area 16B in order to keep them insulated from each other, then the first electroconductive area 16A and the second electroconductive area 16B may be disposed in facing relation to each other.

The cells 22A, 22B are not limited to having a lozenge shape, but may be of a parallelogrammatic shape. On the condition that the cells 22A, 22B are of a parallelogrammatic shape, the cells 22A, 22B have opposite angles in which the crossing angles of the fine silver lines 20 are obtuse angles, and opposite angles in which the crossing angles of the fine silver lines 20 are acute angles.

Inventive Example 1

Inventive examples of the present invention will be described below in specific detail. The materials, amounts used, ratios, processing details, and processing sequences described in the inventive examples can be changed without departing from the spirit of the present invention. Therefore, the scope of the present invention shall not be interpreted as being restricted by the specific examples described below.

[OCA]

According to Table 1, principal components and 0.04 parts by weight of IRGACURE 651 (trademark of 2,2-dimethoxy-2-phenylacetophenon manufactured by Ciba Japan, hereinafter referred to as "Irg651") as a photopolymerization initiator were weighed and mixed together suitably in a glass container, and a nitrogen gas was substituted for dissolved oxygen, after which the solution was irradiated with ultraviolet rays for several minutes by a low-pressure mercury lamp in order to bring about partial polymerization, thereby obtaining a viscous liquid having a viscosity of approximately 1500 cP. 0.15 parts by weight of an additional photopolymerization initiator (Irg651) were added to the obtained composition, and the composition was stirred sufficiently. After the mixture was defoamed in a vacuum, the mixture was applied to a polyester film (peel-off film), which was 50 μm thick, and was subjected to a peeling process, such that a film thickness of 100 μm was achieved after drying. The coated film was covered with a peel-off film in order to remove oxygen, which would impair polymerization. Both sides of the assembly were irradiated for approximately 4 minutes by a low-pressure mercury lamp, thereby obtaining a transparent adhesive sheet. The value of tan δ and the storage elastic modulus of the obtained sheet were measured according to the process described below. The results of such measurements are shown below in Table 1.

TABLE 1

| Examples of synthesis | Main components | | | | | | | | | | Initiator, cross-linking agents | | |
|---|---|---|---|---|---|---|---|---|---|---|---|---|---|
| | 2EHA | IOA | BA | ICA | IBXA | AA | DAAM | V#190 | HEA | HPA | Irg651 | V-65 | HDDA |
| 1 | 80.0 | | | | | 5.0 | | 15.0 | | | 0.04 | | |
| 2 | 80.0 | | | | | 5.0 | | 15.0 | | | 0.04 | | 0.025 |
| 3 | 80.0 | | | | | 5.0 | | 15.0 | | | 0.04 | | 0.060 |
| 4 | 80.0 | | | | | 5.0 | | 15.0 | | | 0.04 | | 0.100 |
| 5 | 80.0 | | | | | 5.0 | | 15.0 | | | 0.04 | | 0.125 |
| 6 | 80.0 | | | | | | 5.0 | 15.0 | | | 0.04 | | 0.100 |
| 7 | 87.0 | | | | | 9.0 | | 4.0 | 2.5 | | 0.04 | | 0.025 |
| 8 | | 87.5 | | | | 10.0 | | | | 8.5 | 0.04 | | 0.100 |
| 9 | | 87.5 | | | | 4.0 | | | | 8.5 | 0.04 | | 0.100 |
| 10 | | | 87.5 | | | 4.0 | | | | | 0.04 | | 0.100 |
| 11 | 90.0 | | | | | 5.0 | | | | | 0.04 | | 0.100 |
| 12 | 47.0 | | | | 23.0 | 10.0 | | 20.0 | | | 0.04 | | 0.025 |
| 13 | 75.0 | | | | 5.0 | 5.0 | | 15.0 | | | 0.04 | | 0.025 |

TABLE 1-continued

| | | | | | | | |
|---|---|---|---|---|---|---|---|
| 14 | 70.0 | 10.0 | 5.0 | 15.0 | | 0.04 | 0.060 |
| 15 | 65.0 | 15.0 | 5.0 | 15.0 | | 0.04 | 0.060 |
| 16 | 55.0 | 25.0 | 5.0 | 15.0 | | 0.04 | 0.060 |
| 17 | 50.0 | 30.0 | 5.0 | 15.0 | | 0.04 | 0.060 |
| 18 | 65.0 | | 5.0 | 15.0 | 15.0 | 0.04 | 0.060 |
| 19 | 58.0 | 25.0 | 2.0 | | 15.0 | | 0.10 |
| 20 | 48.0 | 25.0 | 2.0 | | 25.0 | | 0.10 |
| 21 | 43.0 | 30.0 | 2.0 | | 25.0 | | 0.10 |
| 22 | 48.0 | 25.0 | 2.0 | | 25.0 | | 0.10 |
| 23 | 48.0 | 25.0 | 2.0 | | 25.0 | | 0.10 |
| 24 | 48.0 | 25.0 | 2.0 | | 25.0 | | 0.10 |

| Examples of synthesis | Initiator, cross-linking agents | | MGI | | tanδ | Storage elastic modulus × $10^4$ Pa |
|---|---|---|---|---|---|---|
| | L-45 | Irg651[X] | Compound | Content | | |
| 1 | | 0.15 | | | 0.59 | 4.3 |
| 2 | | 0.15 | | | 0.34 | 4.5 |
| 3 | | 0.15 | | | 0.19 | 5.0 |
| 4 | | 0.15 | | | 0.13 | 5.0 |
| 5 | | 0.15 | | | 0.11 | 4.5 |
| 6 | | 0.15 | | | 0.09 | 3.0 |
| 7 | | 0.15 | | | 0.34 | 9.1 |
| 8 | | 0.15 | | | 0.15 | 8.9 |
| 9 | | 0.15 | | | 0.22 | 8.1 |
| 10 | | 0.15 | | | 0.26 | 7.0 |
| 11 | | 0.15 | | | 0.22 | 4.9 |
| 12 | | 0.15 | | | 0.44 | 6.3 |
| 13 | | 0.15 | | | 0.26 | 3.5 |
| 14 | | 0.15 | | | 0.27 | 3.1 |
| 15 | | 0.15 | | | 0.28 | 2.7 |
| 16 | | 0.15 | | | 0.26 | 3.3 |
| 17 | | 0.15 | | | 0.24 | 3.6 |
| 18 | | 0.15 | | | 0.26 | 4.7 |
| 19 | 0.700 | | | | 0.24 | 5.3 |
| 20 | 0.700 | | | | 0.22 | 5.8 |
| 21 | 0.700 | | | | 0.20 | 6.4 |
| 22 | 0.700 | | a | 0.50 | 0.22 | 5.8 |
| 23 | 0.700 | | b | 0.50 | 0.22 | 5.8 |
| 24 | 0.700 | | c | 0.50 | 0.22 | 5.8 |

[Process of Measuring the Storage Elastic Modulus and Tan δ (Loss Tangent) (Dynamic Viscoelastic Characteristics)]
(Sample Production)

A sheet having a thickness of approximately 3 mm, on which the transparent adhesive sheet fabricated according to the above process was stacked, was blanked by a blanking blade having a diameter of 7.9 mm, thereby obtaining a cylindrical sample.
(Measurement)

The dynamic viscoelastic characteristics were measured using an Advanced Rheometric Expansion System (ARES) manufactured by Rheometric Scientific, Inc. The utilized sample fixing jig was made up of parallel plates having a diameter of 7.9 mm. The sample, which was fabricated as described above, was placed between the parallel plates and tension was adjusted. The dynamic viscoelastic characteristics were measured in air within a temperature range of −50 to 200° C. and at a rising temperature rate of 5° C. per minute in a shearing mode at a frequency of 1.0 Hz. The storage elastic modulus G' (Pa) at 25° C. and the loss tangent tan δ at 140° C. were determined.

Specific substance names of the main components, the initiators or the cross-linking agents, their ratios, the loss coefficients tan δ, and the storage elastic moduli are shown comprehensively in Table 1.

2EHA, IOA, BA, ICA, IBXA, AA, DAAM, V#190, HEA, and HPA represent 2-ethylhexyl acrylate, isooctyl acrylate, n-butyl acrylate, isocetyl acrylate, isobornyl acrylate, acrylic acid, diacetone acrylamide, ethoxyethoxyethyl acrylate, 2-hydroxyethyl acrylate, and 2-hydroxypropyl acrylate, respectively. Irg651 and V-65 represent polymerization initiators manufactured by BASF Japan and Wako Pure Chemical Industries, Ltd. HDDA (1,6-hexanediol acrylate) and L-45 (isocyanate) represent cross-linking agents.

Compound a is DL-α-tocopherol with a reduction potential of 0.56 V. Compound b and Compound c are substances with structures that are represented, respectively, by the following Formulas (6) and (7), having reduction potentials of 1.09 V and 1.17 V, respectively.

[Chem. 8]

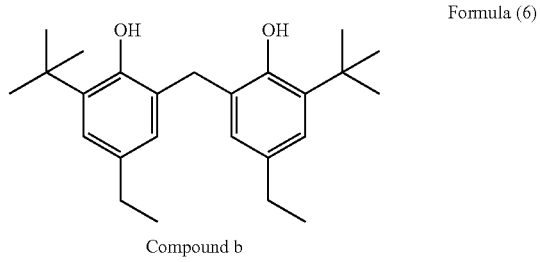

Formula (6)

Compound b

-continued

[Chem. 9]

Formula (7)

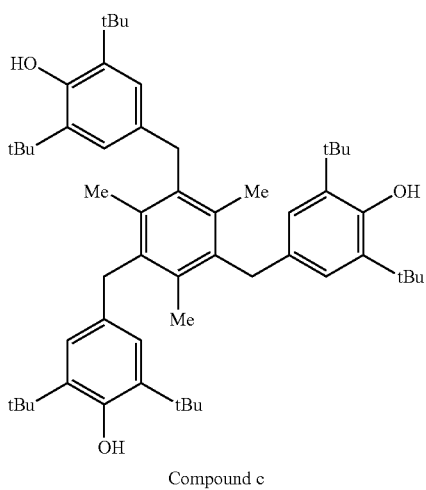

Compound c

[Fabrication 1-V Mode for Assessment Base]

Figure 6:
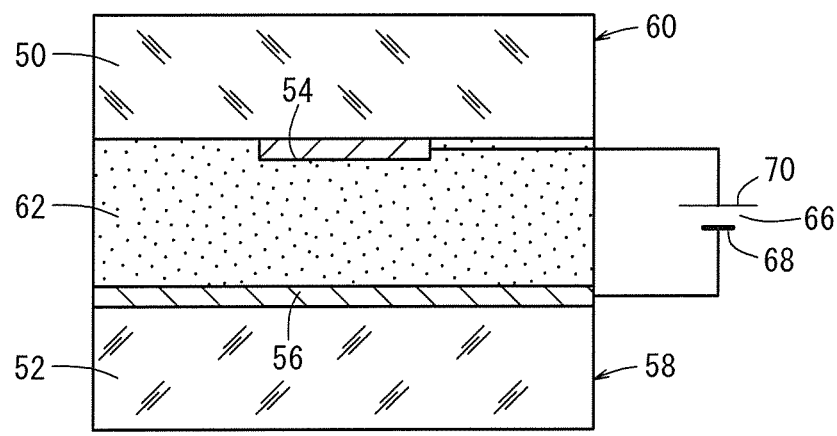
FIG. 6 is a schematic vertical cross-sectional view of a base for V mode assessment.

Fine silver lines were patterned respectively on the PET bases 50 and 52 shown in FIG. 6 by a microcontact printing patterning process, according to the procedure described in Japanese Laid-Open Patent Publication No. 2012-519329 (PCT), paragraph [0104], thereby forming an anode 54 and a cathode 56 having an elongate mesh-like structure, and thus fabricating the electroconductive sheets 58 and 60. The cells thereof were of a lozenge shape.

Figure 7:
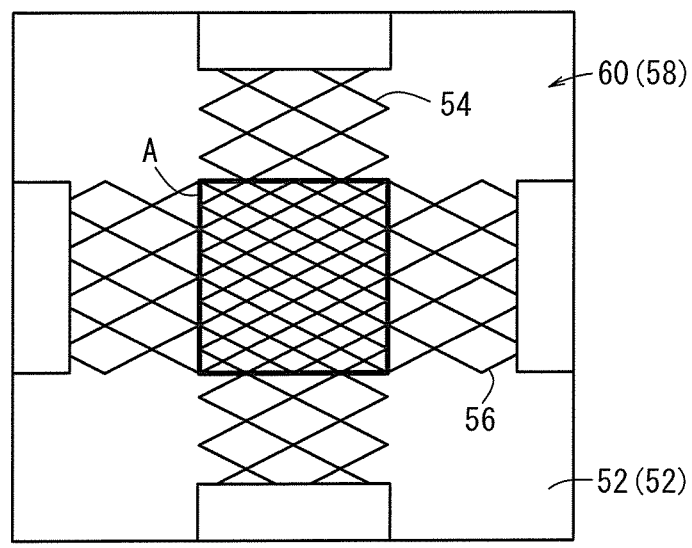
FIG. 7 is a schematic plan view of the base for V mode assessment.

One principal surface (the surface on which the cathode 56 was formed) of the electroconductive sheet 58 was coated to 100 μm with an OCA 62 of any one of synthesis examples Nos. 1 through 24 shown in Table 1. Thereafter, as shown in FIG. 7, the electroconductive sheet 60 was placed on the OCA 62 such that the cathode 56 and the anode 54 faced each other perpendicularly to thereby obtain the V-mode assessment base 64. A negative pole 68 and a positive pole 70 of a DC power supply 66 (voltage: 15 V) were electrically connected, respectively, to the cathode 56 and the anode 54.

The area of an overlapping portion A (surrounded by the thick lines) where the anode 54 and the cathode 56 cross each other was 9 mm².

[Fabrication 2-H Mode for Assessment Base]

Figure 8:
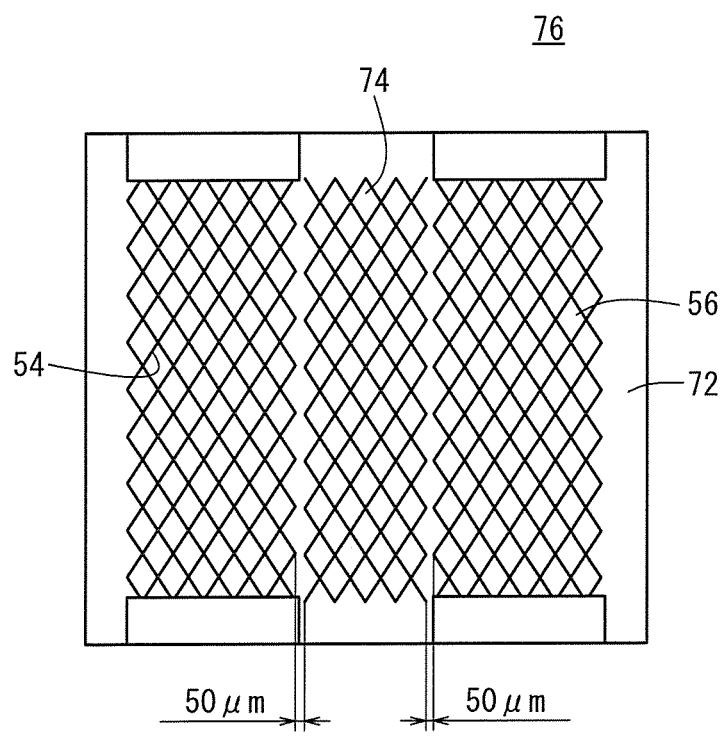
FIG. 8 is a schematic plan view of a base for H mode assessment.

Fine silver lines were patterned respectively on the PET base 72 shown in FIG. 8 by a microcontact printing patterning process, according to the procedure described in Japanese Laid-Open Patent Publication No. 2012-519329 (PCT), paragraph [0104], thereby forming an anode 54, a dummy electrode 74, and a cathode 56 having an elongate parallel mesh-like structure, and thus fabricating the electroconductive sheet 76. The cells thereof were of a lozenge shape. The widthwise dimension of the anode 54 and the cathode 56 was 3 mm, the widthwise dimension of the dummy electrode 74 was 2 mm, a clearance (spaced distance) between the anode 54 and the dummy electrode 74 was 50 μm, and a clearance (spaced distance) between the dummy electrode 74 and the cathode 56 was 50 μm.

Figure 9:
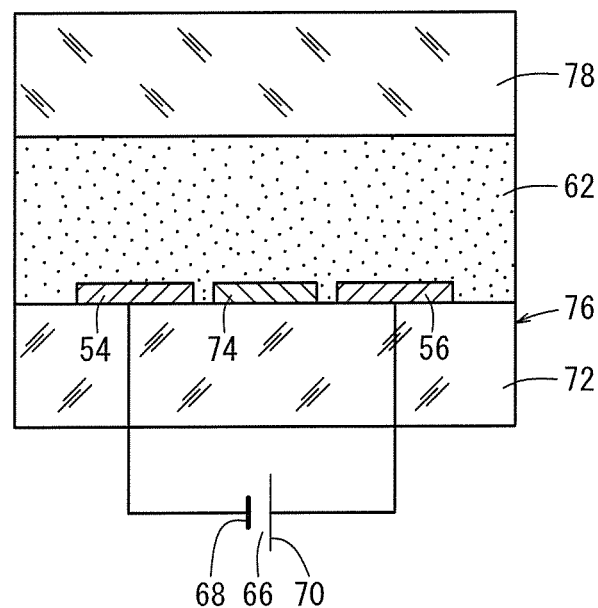
FIG. 9 is a schematic vertical cross-sectional view of the base for H mode assessment.

As shown in FIG. 9, an OCA 62, which was 100 μm thick and composed of any one of synthesis examples Nos. 1 through 24 shown in Table 1, was applied to one principal surface (the surface on which the anode 54, the dummy electrode 74, and the cathode 56 were formed) of the electroconductive sheet 76. Thereafter, a PET base 78 was placed on the OCA 62 to thereby obtain the H-mode assessment base 80. Similar to the case of the V-mode assessment base 64, the negative pole 68 and the positive pole 70 of the DC power supply 66 (voltage: 15 V) were electrically connected, respectively, to the cathode 56 and the anode 54.

In the above examples, the assessment bases were fabricated using a microcontact printing patterning process. However, the assessment bases may be fabricated using a silver salt process. Inventive Example 36, to be described later, was obtained in the same manner as Inventive Example 30, except that the mesh electrodes were fabricated by a silver salt process.

[Evaluation 1—Silver Migration]

Based on a change in the resistance value between the cathode 56 and the anode 54, the V-mode assessment base 64 was assessed for the degree of silver migration. More specifically, the time was measured until the resistance value dropped to $1\times10^5 \Omega$ at 80° C. with a relative humidity of 85% under one atmospheric pressure. Examples in which the measured time was 40 hours or greater were assessed as good (A). Examples in which the measured time was 30 hours or greater and less than 40 hours were assessed as falling within an allowable range (B). Examples in which the measured time was less than 30 hours were assessed as insufficient (C).

The H-mode assessment base 80 was assessed for the degree of silver migration, based on the rate of change of the resistance of the anode 54. More specifically, the rate of change of the resistance of the anode 54 was measured after the H-mode assessment base 80 had been energized for 100 hours at 80° C. with a relative humidity of 85% under one atmospheric pressure. Examples in which the measured rate of change in resistance was less than 5% were assessed as good (A). Examples in which the measured rate of change in resistance was 5% or greater and less than 10% were assessed as falling within an allowable range (B). Examples in which the measured rate of change in resistance was 10% or greater were assessed as insufficient (C).

[Evaluation 2—Visibility]

After the H-mode assessment base 80 had been energized for 100 hours, the H-mode assessment base 80 was organoleptically assessed for visibility of the electrodes. More specifically, examples in which the fine silver lines became visible due to a change in the shape of the electrodes caused by thickened lines, thickened points of intersection, or dendrites were assessed as defective (C). Examples in which the fine silver lines became slightly visible were assessed as falling within an allowable range (B). Examples in which the fine silver lines were not visible yet were assessed as good (A).

[Evaluation 3—Whitening]

Figure 10:
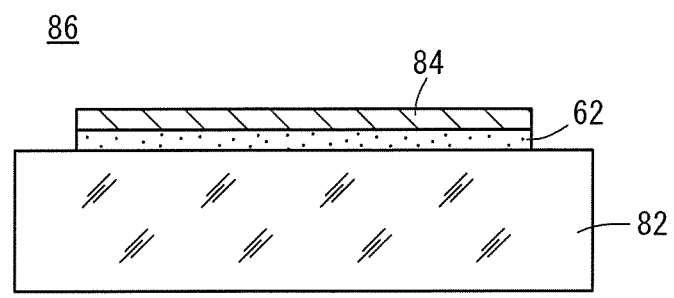
FIG. 10 is a schematic side elevational view of a base for a whitening assessment test.

As shown in FIG. 10, a PET base 84 having a thickness of 50 μm was placed on one principal surface of a glass base 82, with an OCA 62 of any one of synthesis examples Nos. 1 through 24 shown in Table 1 being interposed therebetween, in order to produce a base 86 for a whitening assessment test. Thereafter, the base 86 was exposed for 72 hours to an environment having a temperature of 65° C. and a relative humidity of 95%, and further was exposed to an environment having a temperature of 23° C. and a relative humidity of 50%. The time was measured until the haze reached a level of 3% or less. HR-100 manufactured by Murakami Color Research Laboratory was used to perform this measurement.

The haze (%) was measured in the following manner. The peel-off PET film provided on one surface of a transparent double-sided adhesive sheet, which was obtained as described above, was peeled off, and the adhesive surface was applied to an optical PET film (COSMOSHINE manufactured by Toray Industries, Ltd.). The other peel-off PET film was peeled off, and the adhesive surface was applied to glass (EAGLE XG manufactured by Dow Corning). After such an assembly was exposed to conditions of 50° C. and five atmospheric pressures for 30 minutes, the assembly was left standing still for 24 hours under conditions of 25° C. and a relative humidity of 50%. Thereafter, the haze was measured using a haze meter MODEL TC-H3 manufactured by Tokyo Denshoku Co., Ltd.

Examples for which the time until the haze reached 3% or less was 6 hours were assessed as good (A). Examples for which the time until the haze reached 3% or less ranged from 6 to 12 hours were assessed as falling within an allowable range (B). Examples for which the time until the haze reached 3% or less was in excess of 12 hours were assessed as defective (C).

[Results of Assessment]

The results of the assessment, together with acute angles, cell pitches, and line widths of the lozenge-shaped cells, and the synthesis example number and property values of the OCA 62 that was used therewith, are shown together in Table 2 as Inventive Examples 1 through 18 and Comparative Examples 1 through 3. It can be understood from Table 2 that it is possible to obtain a touch panel, which prevents migration from occurring and exhibits excellent visibility, by employing mesh electrodes in which the cells are of a lozenge shape and the line width is 4 μm or less, and an OCA 62 in which the loss coefficient (tan δ) is 0.13 or greater and the storage elastic modulus is $8.9 \times 10^4$ Pa or less.

As can be understood from synthesis examples Nos. 19, 20, and 21, in which the OCA 62 contains the following components (A) through (C), synthesis examples Nos. 19, 20, and 21 exhibited excellent whitening characteristics.

(A): An alkyl(meth)acrylate monomer having a glass transition temperature Tg of 25° C. or less (the alkyl group has 4 through 18 carbon atoms);

(B): An ester of (meth)acrylate monomer having a glass transition temperature Tg in excess of 25° C.; and (C): A monomer selected from the group of hydroxyalkyl (meth)acrylate, unsubstituted (meth)acrylamide, N-alkyl-substituted (meth)acrylamide, N,N-dialkyl-substituted (meth)acrylamide, a monomer having a urea functional group, and a monomer having a lactam functional group, a tertiary amine, an alicyclic amine, an aromatic amine, or a combination of such materials.

The above assessment was carried out on examples in which the OCA 62 of synthesis example No. 20 or synthesis example No. 8 was used, and the acute angle, cell pitch, and line width, etc., of the lozenge-shaped cells were changed to various values. The results of the assessment for examples in which only the angle was changed are shown in Table 3 as Inventive Examples 19 through 22. It can be understood from Table 3 that touch panels, for which the migration, visibility, and whitening thereof are all good or fall within allowable ranges, can be obtained even on the condition that the acute angles of the cells lie within a range of 30° to 70°.

TABLE 2

| | Mesh electrodes | | | | OCA | | Migration assessment | | | |
|---|---|---|---|---|---|---|---|---|---|---|
| | Shape | Angle | Pitch | Line width | No. | tan δ | Storage elastic modulus × $10^4$ Pa | V mode | H mode | Visibility | Whitening |
| Inventive Example 1 | Lozenge shape | 60° | 300 μm | 3 μm | 1 | 0.59 | 4.3 | B | A | A | B |
| Inventive Example 2 | ↑ | ↑ | ↑ | ↑ | 2 | 0.34 | 4.5 | B | A | A | B |
| Inventive Example 3 | ↑ | ↑ | ↑ | ↑ | 3 | 0.19 | 5.0 | B | B | A | B |
| Inventive Example 4 | ↑ | ↑ | ↑ | ↑ | 4 | 0.13 | 5.0 | B | B | B | B |
| Comparative Example 1 | ↑ | ↑ | ↑ | ↑ | 5 | 0.11 | 4.5 | C | B | B | B |
| Comparative Example 2 | ↑ | ↑ | ↑ | ↑ | 6 | 0.09 | 3.0 | C | B | B | B |
| Comparative Example 3 | ↑ | ↑ | ↑ | ↑ | 7 | 0.34 | 9.1 | C | B | B | B |
| Inventive Example 5 | ↑ | ↑ | ↑ | ↑ | 8 | 0.15 | 8.9 | B | B | A | B |
| Inventive Example 6 | ↑ | ↑ | ↑ | ↑ | 9 | 0.22 | 8.1 | B | B | A | B |
| Inventive Example 7 | ↑ | ↑ | ↑ | ↑ | 10 | 0.26 | 7.0 | B | A | A | B |
| Inventive Example 8 | ↑ | ↑ | ↑ | ↑ | 11 | 0.22 | 4.9 | B | A | A | B |
| Inventive Example 9 | ↑ | ↑ | ↑ | ↑ | 12 | 0.44 | 6.3 | B | A | A | C |
| Inventive Example 10 | ↑ | ↑ | ↑ | ↑ | 13 | 0.26 | 3.5 | B | A | A | B |
| Inventive Example 11 | ↑ | ↑ | ↑ | ↑ | 14 | 0.27 | 3.1 | B | A | A | B |
| Inventive Example 12 | ↑ | ↑ | ↑ | ↑ | 15 | 0.28 | 2.7 | B | A | A | B |
| Inventive Example 13 | ↑ | ↑ | ↑ | ↑ | 16 | 0.26 | 3.3 | B | A | A | B |
| Inventive Example 14 | ↑ | ↑ | ↑ | ↑ | 17 | 0.24 | 3.6 | B | A | A | B |
| Inventive Example 15 | ↑ | ↑ | ↑ | ↑ | 18 | 0.26 | 4.7 | B | A | A | A |
| Inventive Example 16 | ↑ | ↑ | ↑ | ↑ | 19 | 0.24 | 5.3 | B | A | A | A |
| Inventive Example 17 | ↑ | ↑ | ↑ | ↑ | 20 | 0.22 | 5.8 | B | A | A | A |
| Inventive Example 18 | ↑ | ↑ | ↑ | ↑ | 21 | 0.20 | 6.4 | B | A | A | A |

TABLE 3

| | Mesh electrodes | | | | | OCA | | Migration assessment | | | |
|---|---|---|---|---|---|---|---|---|---|---|---|
| | | | | Line | | | Storage elastic modulus × | | | | |
| | Shape | Angle | Pitch | width | No. | tanδ | $10^4$ Pa | V mode | H mode | Visibility | Whitening |
| Inventive Example 19 | Lozenge shape | 70° | 300 μm | 3 μm | 20 | 0.22 | 5.8 | B | A | A | A |
| Inventive Example 20 | ↑ | 45° | ↑ | ↑ | 20 | 0.22 | 5.8 | B | A | A | A |
| Inventive Example 21 | ↑ | 30° | ↑ | ↑ | 20 | 0.22 | 5.8 | B | B | A | A |
| Inventive Example 22 | ↑ | 30° | ↑ | ↑ | 8 | 0.15 | 8.9 | B | B | B | B |

Table 4 shows the results of the assessment for examples (Inventive Examples 23 through 26) in which only the cell pitch was changed. Table 5 shows the results of the assessment for examples (Inventive Examples 27 through 29) in which only the line width pitch was changed. It can be understood from Table 4 and Table 5 that touch panels, for which the migration, visibility, and whitening thereof are all good or fall within allowable ranges, can be obtained even on the condition that the cell pitch with excellent visibility lies within a range of 300 μm or less, and the line width with excellent visibility lies within a range of 2 μm or less.

Table 6 shows the results of an assessment of Inventive Examples 30 through 36, in which the OCA contained a migration inhibitor comprising a phenolic compound, and in which the acute angle, the cell pitch, and the line width were changed to various values. As can be understood from Table 6, touch panels that exhibit a high migration prevention ability and excellent visibility can be obtained by use of the OCA, which contains a migration inhibitor comprising a phenolic compound.

TABLE 4

| | Mesh electrodes | | | | | OCA | | Migration assessment | | | |
|---|---|---|---|---|---|---|---|---|---|---|---|
| | | | | Line | | | Storage elastic modulus × | | | | |
| | Shape | Angle | Pitch | width | No. | tanδ | $10^4$ Pa | V mode | H mode | Visibility | Whitening |
| Inventive Example 23 | Lozenge shape | 60° | 400 μm | 3 μm | 20 | 0.22 | 5.8 | B | A | A | A |
| Inventive Example 24 | ↑ | ↑ | 200 μm | ↑ | 20 | 0.22 | 5.8 | B | A | A | A |
| Inventive Example 25 | ↑ | ↑ | 100 μm | ↑ | 20 | 0.22 | 5.8 | B | B | A | A |
| Inventive Example 26 | ↑ | ↑ | 100 μm | ↑ | 8 | 0.15 | 8.9 | B | B | B | B |

TABLE 5

| | Mesh electrodes | | | | | OCA | | Migration assessment | | | |
|---|---|---|---|---|---|---|---|---|---|---|---|
| | | | | Line | | | Storage elastic | | | | |
| | Shape | Angle | Pitch | width | No. | tanδ | modulus × $10^4$ Pa | V mode | H mode | Visibility | Whitening |
| Inventive Example 27 | Lozenge shape | 60° | 300 μm | 4 μm | 20 | 0.22 | 5.8 | B | A | A | A |
| Inventive Example 28 | ↑ | ↑ | ↑ | 1.8 μm | 20 | 0.22 | 5.8 | B | B | A | A |
| Inventive Example 29 | ↑ | ↑ | ↑ | 1.8 μm | 8 | 0.15 | 8.9 | B | B | B | B |

TABLE 6

| | Mesh electrodes | | | | OCA | | Migration assessment | | | |
| --- | --- | --- | --- | --- | --- | --- | --- | --- | --- | --- |
| | | | | | | Storage elastic modulus × | | | | |
| | Shape | Angle | Pitch | Line width | No. | tanδ | $10^4$ Pa | V mode | H mode | Visibility | Whitening |
| Inventive Example 30 | Lozenge shape | 60° | 300 μm | 3 μm | 22 | 0.22 | 5.8 | A | A | A | A |
| Inventive Example 31 | ↑ | ↑ | ↑ | 1.8 μm | 22 | 0.22 | 5.8 | A | A | A | A |
| Inventive Example 32 | ↑ | 45° | 100 μm | 3 μm | 22 | 0.22 | 5.8 | A | A | A | A |
| Inventive Example 33 | ↑ | ↑ | ↑ | 1.8 μm | 22 | 0.22 | 5.8 | B | A | A | A |
| Inventive Example 34 | ↑ | ↑ | ↑ | ↑ | 23 | 0.22 | 5.8 | B | A | A | A |
| Inventive Example 35 | ↑ | ↑ | ↑ | ↑ | 24 | 0.22 | 5.8 | B | A | A | A |
| Inventive Example 36 | ↑ | 60° | 300 μm | 3 μm | 22 | 0.22 | 5.8 | A | A | A | A |

\* Inventive Example 36 included mesh electrodes formed by a silver salt process.

Finally, as made clear from Inventive Example 36, the mesh electrodes that are formed by a silver salt process offer the same advantages as the mesh electrodes that are formed by a microcontact printing patterning process.

The invention claimed is:

1. A touch panel having a first electrode layer and a second electrode layer, which face each other with an insulating layer interposed therebetween, wherein:
    the first electrode layer includes a plurality of first electrodes extending along a first direction and arrayed parallel to each other along a second direction that is perpendicular to the first direction;
    the second electrode layer includes a plurality of second electrodes extending along the second direction and arrayed parallel to each other along the first direction;
    at least one of the first electrodes and the second electrodes comprises a mesh of fine silver lines each having a widthwise dimension of 4 μm or less;
    the mesh includes a plurality of cells defined by the fine silver lines crossing each other;
    at least one of the cells is of a parallelogrammatic shape having opposite angles for which crossing angles formed by the fine silver lines crossing each other are obtuse angles, and opposite angles for which crossing angles formed by the fine silver lines crossing each other are acute angles; and
    an adhesive, whose loss coefficient tan δ at 140° C. and 1 Hz is 0.13 or greater and whose storage elastic modulus at 25° C. and 1 Hz is $8.9 \times 10^4$ Pa or less, is disposed on at least one of the first electrodes and the second electrodes, which comprises the mesh and the insulating layer.

2. The touch panel according to claim 1, wherein the crossing angles formed by the fine silver lines crossing each other are 70° or less at the opposite angles that are the acute angles of the cells having the parallelogrammatic shape.

3. The touch panel according to claim 1, wherein the cells having the parallelogrammatic shape are of a lozenge shape.

4. The touch panel according to claim 1, wherein the cells have a cell pitch of 300 μm or less.

5. The touch panel according to claim 1, wherein each of the fine silver lines has a widthwise dimension of 2 μm or less.

6. The touch panel according to claim 1, wherein the adhesive contains the following components (A) through (C):
    (A): An alkyl(meth)acrylate monomer whose glass transition temperature Tg is 25° C. or lower (the alkyl group has 4 through 18 carbon atoms);
    (B): An ester of (meth)acrylate monomer whose glass transition temperature Tg is in excess of 25° C.; and
    (C): A monomer selected from a group of hydroxyalkyl (meth)acrylate, unsubstituted (meth)acrylamide, N-alkyl-substituted (meth)acrylamide, N,N-dialkyl-substituted (meth)acrylamide, a monomer having a urea functional group, and a monomer having a lactam functional group, a tertiary amine, an alicyclic amine, an aromatic amine, or a combination of these materials.

7. The touch panel according to claim 1, wherein the adhesive contains a migration inhibitor comprising a phenolic compound.

8. The touch panel according to claim 1, wherein at least one of the first electrodes and the second electrodes, which comprises the mesh, is formed by a microcontact printing patterning process or a silver salt process.

9. A display device including a touch panel according to claim 1.

* * * * *